US012121068B2

(12) United States Patent
Crump et al.

(10) Patent No.: US 12,121,068 B2
(45) **Date of Patent: *Oct. 22, 2024**

(54) SUSCEPTOR ARRANGEMENT FOR AN INDUCTIVELY-HEATED AEROSOL DELIVERY DEVICE

(71) Applicant: NICOVENTURES TRADING LIMITED, London (GB)

(72) Inventors: Bridget B. Crump, Greensboro, NC (US); Karen H. Cleckley, Kernersville, NC (US); Andries D. Sebastian, Winston-Salem, NC (US); Stephen B. Sears, Siler City, NC (US); Kenneth A. Beard, Lexington, NC (US)

(73) Assignee: NICOVENTURES TRADING LIMITED, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/895,211

(22) Filed: Aug. 25, 2022

(65) Prior Publication Data

US 2022/0408826 A1 Dec. 29, 2022

Related U.S. Application Data

(63) Continuation of application No. 16/744,479, filed on Jan. 16, 2020, now Pat. No. 11,457,665.

(51) Int. Cl.
*A24F 13/00* (2006.01)
*A24B 15/167* (2020.01)
(Continued)

(52) U.S. Cl.
CPC .......... *A24F 40/465* (2020.01); *A24B 15/167* (2016.11); *A24F 40/20* (2020.01); *H05B 6/105* (2013.01)

(58) Field of Classification Search
USPC .................................................. 131/328–329
See application file for complete search history.

(56) References Cited

U.S. PATENT DOCUMENTS 2,057,353 A 10/1936 Whittlemore, Jr.
2,104,266 A 1/1938 McCormick
(Continued)

FOREIGN PATENT DOCUMENTS

CN 1541577 A 11/2004
CN 2719043 Y 8/2005
(Continued)

OTHER PUBLICATIONS

International Search Report from the corresponding International Application No. PCT/IB2021/050307, mailed Mar. 24, 2021.

*Primary Examiner* — Phuong K Dinh
(74) *Attorney, Agent, or Firm* — WOMBLE BOND DICKINSON (US) LLP

(57) ABSTRACT

An aerosol delivery device and an aerosol source member for use with an inductive heating aerosol delivery device are provided. The aerosol delivery device comprises a control body having a housing, a resonant transmitter located in the control body, a control component configured to drive the resonant transmitter, and an aerosol source member that includes a substrate portion at least a portion of which is configured to be positioned within range of a field emitted by the resonant transmitter. The substrate portion may include a substrate material and one or more separators, the one or more separators may be configured to separate the substrate material into a plurality of separate substrate segments, and the one or more separators may comprise susceptors configured to be heated by the resonant transmitter.

18 Claims, 8 Drawing Sheets

(51) Int. Cl.

| | |
|---|---|
| ***A24F 40/20*** | (2020.01) |
| ***A24F 40/465*** | (2020.01) |
| ***H05B 6/10*** | (2006.01) |

(56) References Cited

U.S. PATENT DOCUMENTS

| | | | | |
|---|---|---|---|---|
| 3,200,819 | A | 8/1965 | Gilbert | |
| 4,922,901 | A | 5/1990 | Brooks et al. | |
| 5,060,671 | A | 10/1991 | Counts et al. | |
| 5,093,894 | A | 3/1992 | Deevi et al. | |
| 5,261,424 | A | 11/1993 | Sprinkel, Jr. | |
| 5,388,574 | A | 2/1995 | Ingebrethsen et al. | |
| 5,530,225 | A | 6/1996 | Hajaligol | |
| 5,687,746 | A | 11/1997 | Rose et al. | |
| 5,726,421 | A | 3/1998 | Fleischhauer et al. | |
| 5,865,185 | A | 2/1999 | Collins et al. | |
| 5,894,841 | A | 4/1999 | Voges | |
| 6,125,853 | A | 10/2000 | Susa et al. | |
| 6,155,268 | A | 12/2000 | Takeuchi | |
| 7,117,867 | B2 | 10/2006 | Cox et al. | |
| 7,832,410 | B2 | 11/2010 | Hon | |
| 8,314,591 | B2 | 11/2012 | Terry et al. | |
| 8,365,742 | B2 | 2/2013 | Hon | |
| 8,499,766 | B1 | 8/2013 | Newton | |
| 10,750,787 | B2 * | 8/2020 | Chong | H05B 6/44 |
| 10,863,770 | B2 * | 12/2020 | Mironov | H05B 6/108 |
| 11,064,725 | B2 * | 7/2021 | Wilke | A24D 1/20 |
| 11,457,665 | B2 * | 10/2022 | Crump | A24F 40/465 |
| 11,478,018 | B2 * | 10/2022 | Mironov | H05B 6/108 |
| 2005/0016550 | A1 | 1/2005 | Katase | |
| 2006/0196518 | A1 | 9/2006 | Hon | |
| 2008/0092912 | A1 | 4/2008 | Robinson et al. | |
| 2009/0095311 | A1 | 4/2009 | Han | |
| 2009/0126745 | A1 | 5/2009 | Hon | |
| 2009/0188490 | A1 | 7/2009 | Han | |
| 2009/0272379 | A1 | 11/2009 | Thorens et al. | |
| 2011/0094523 | A1 | 4/2011 | Thorens et al. | |
| 2011/0126848 | A1 | 6/2011 | Zuber et al. | |
| 2011/0155718 | A1 | 6/2011 | Greim et al. | |
| 2011/0168194 | A1 | 7/2011 | Hon | |
| 2011/0265806 | A1 | 11/2011 | Alarcon et al. | |
| 2011/0290248 | A1 | 12/2011 | Schennum | |
| 2012/0111347 | A1 | 5/2012 | Hon | |
| 2012/0260927 | A1 | 10/2012 | Liu | |
| 2012/0279512 | A1 | 11/2012 | Hon | |
| 2013/0037041 | A1 | 2/2013 | Worm et al. | |
| 2013/0056013 | A1 | 3/2013 | Terry et al. | |
| 2013/0306084 | A1 | 11/2013 | Flick | |
| 2014/0000638 | A1 | 1/2014 | Sebastian et al. | |
| 2014/0060554 | A1 | 3/2014 | Collett et al. | |
| 2014/0060555 | A1 | 3/2014 | Chang et al. | |
| 2014/0096781 | A1 | 4/2014 | Sears et al. | |
| 2014/0096782 | A1 | 4/2014 | Ampolini et al. | |
| 2014/0209105 | A1 | 7/2014 | Sears et al. | |
| 2014/0253144 | A1 | 9/2014 | Novak et al. | |
| 2014/0261408 | A1 | 9/2014 | DePiano et al. | |
| 2014/0261486 | A1 | 9/2014 | Potter et al. | |
| 2014/0261487 | A1 | 9/2014 | Chapman et al. | |
| 2014/0261495 | A1 | 9/2014 | Novak et al. | |
| 2014/0270727 | A1 | 9/2014 | Ampolini et al. | |
| 2014/0270729 | A1 | 9/2014 | DePiano et al. | |
| 2014/0270730 | A1 | 9/2014 | DePiano et al. | |
| 2019/0200677 | A1 | 7/2019 | Chong et al. | |

FOREIGN PATENT DOCUMENTS

| | | | |
|---|---|---|---|
| CN | 201379072 | Y | 1/2010 |
| EP | 0295122 | A2 | 12/1988 |
| EP | 0845220 | A1 | 6/1998 |
| EP | 1618803 | A1 | 1/2006 |
| GB | 2469850 | A | 11/2010 |
| WO | 2003/034847 | A1 | 5/2003 |
| WO | 2004/080216 | A1 | 9/2004 |
| WO | 2005/099494 | A1 | 10/2005 |
| WO | 2007/131449 | A1 | 11/2007 |
| WO | 2018/041924 | A1 | 3/2018 |
| WO | 2019/057942 | A1 | 3/2019 |
| WO | 2019/073237 | A1 | 4/2019 |

* cited by examiner

SUSCEPTOR ARRANGEMENT FOR AN INDUCTIVELY-HEATED AEROSOL DELIVERY DEVICE

CROSS-REFERENCE TO RELATED APPLICATIONS

This application is a continuation application of U.S. patent application Ser. No. 16/744,479, filed on Jan. 16, 2020, which is incorporated herein in its entirety by reference.

TECHNOLOGICAL FIELD

The present disclosure relates to aerosol source members and aerosol delivery devices and uses thereof for yielding tobacco components or other materials in inhalable form. More particularly, the present disclosure relates to aerosol source members and aerosol delivery devices and systems, such as smoking articles, that utilize electrically-generated heat to heat substrate material, which may be tobacco or a tobacco derived material, preferably without significant combustion, in order to provide an inhalable substance in the form of an aerosol for human consumption.

BACKGROUND

Many smoking articles have been proposed through the years as improvements upon, or alternatives to, smoking products based upon combusting tobacco. Exemplary alternatives have included devices wherein a solid or liquid fuel is combusted to transfer heat to tobacco or wherein a chemical reaction is used to provide such heat source. Examples include the smoking articles described in U.S. Pat. No. 9,078,473 to Worm et al., which is incorporated herein by reference.

The point of the improvements or alternatives to smoking articles typically has been to provide the sensations associated with cigarette, cigar, or pipe smoking, without delivering considerable quantities of incomplete combustion and pyrolysis products. To this end, there have been proposed numerous smoking products, flavor generators, and medicinal inhalers which utilize electrical energy to vaporize or heat a volatile material, or attempt to provide the sensations of cigarette, cigar, or pipe smoking without burning tobacco to a significant degree. See, for example, the various alternative smoking articles, aerosol delivery devices and heat generating sources set forth in the background art described in U.S. Pat. No. 7,726,320 to Robinson et al.; and U.S. Pat. App. Pub. Nos. 2013/0255702 to Griffith, Jr. et al.; and 2014/0096781 to Sears et al., which are incorporated herein by reference. See also, for example, the various types of smoking articles, aerosol delivery devices and electrically powered heat generating sources referenced by brand name and commercial source in U.S. Pat. App. Pub. No. 2015/0220232 to Bless et al., which is incorporated herein by reference. Additional types of smoking articles, aerosol delivery devices and electrically powered heat generating sources referenced by brand name and commercial source are listed in U.S. Pat. App. Pub. No. 2015/0245659 to DePiano et al., which is also incorporated herein by reference in its entirety. Other representative cigarettes or smoking articles that have been described and, in some instances, been made commercially available include those described in U.S. Pat. No. 4,735,217 to Gerth et al.; U.S. Pat. Nos. 4,922,901, 4,947,874, and 4,947,875 to Brooks et al.; U.S. Pat. No. 5,060,671 to Counts et al.; U.S. Pat. No. 5,249,586 to Morgan et al.; U.S. Pat. No. 5,388,594 to Counts et al.; U.S. Pat. No. 5,666,977 to Higgins et al.; U.S. Pat. No. 6,053,176 to Adams et al.; U.S. Pat. No. 6,164,287 to White; U.S. Pat No. 6,196,218 to Voges; U.S. Pat. No. 6,810,883 to Felter et al.; U.S. Pat. No. 6,854,461 to Nichols; U.S. Pat. No. 7,832,410 to Hon; U.S. Pat. No. 7,513,253 to Kobayashi; U.S. Pat. No. 7,726,320 to Robinson et al.; U.S. Pat. No. 7,896,006 to Hamano;

U.S. Pat. No. 6,772,756 to Shayan; U.S. Pat. App. Pub. No. 2009/0095311 to Hon; U.S. Pat. App. Pub. Nos. 2006/0196518, 2009/0126745, and 2009/0188490 to Hon; U.S. Pat. App. Pub. No. 2009/0272379 to Thorens et al.; U.S. Pat. App. Pub. Nos. 2009/0260641 and 2009/0260642 to Monsees et al.; U.S. Pat. App. Pub. Nos. 2008/0149118 and 2010/0024834 to Oglesby et al.; U.S. Pat. App. Pub. No. 2010/0307518 to Wang; and WO 2010/091593 to Hon, which are incorporated herein by reference.

Representative products that resemble many of the attributes of traditional types of cigarettes, cigars or pipes have been marketed as ACCORD®by Philip Morris Incorporated; ALPHA™, JOYE 510™ and M4™ by InnoVapor LLC; CIRRUS™ and FLING™ by White Cloud Cigarettes; BLU™ by Fontem Ventures B.V.; COHITA™, COLIBRI™, ELITE CLASSIC™, MAGNUM™, PHANTOM™ and SENSE™ by EPUFFER® International Inc.; DUOPRO™, STORM™ and VAPORKING® by Electronic Cigarettes, Inc.; EGAR™ by Egar Australia; eGo-C™ and eGo-T™ by Joyetech; ELUSION™ by Elusion UK Ltd; EONSMOKE® by Eonsmoke LLC; FIN™ by FIN Branding Group, LLC; SMOKE® by Green Smoke Inc. USA; GREENARETTE™ by Greenarette LLC; HALLIGAN™, HENDU™, JET™, MAXXQ™, PINK™ and PITBULL™ by SMOKE STIK®; HEATBAR™ by Philip Morris International, Inc.; HYDRO IMPERIAL™ and LXE™ from Crown7; LOGIC™ and THE CUBAN™ by LOGIC Technology; LUCI® by Luciano Smokes Inc.; METRO® by Nicotek, LLC; NJOY® and ONEJOY™ by Sottera, Inc.; NO. 7™ by SS Choice LLC; PREMIUM ELECTRONIC CIGARETTE™ by PremiumEstore LLC; RAPP E-MYSTICK™ by Ruyan America, Inc.; RED DRAGON™ by Red Dragon Products, LLC; RUYAN® by Ruyan Group (Holdings) Ltd.; SF® by Smoker Friendly International, LLC; GREEN SMART SMOKER® by The Smart Smoking Electronic Cigarette Company Ltd.; SMOKE ASSIST® by Coastline Products LLC; SMOKING EVERYWHERE® by Smoking Everywhere, Inc.; V2CIGS™ by VMR Products LLC; VAPOR NINE™ by VaporNine LLC; VAPOR4LIFE® by Vapor 4 Life, Inc.; VEPPO™ by E-CigaretteDirect, LLC; VUSE® by R. J. Reynolds Vapor Company; Mistic Menthol product by Mistic Ecigs; and the Vype product by CN Creative Ltd; IQOS™ by Philip Morris International; and GLO™ by British American Tobacco. Yet other electrically powered aerosol delivery devices, and in particular those devices that have been characterized as so-called electronic cigarettes, have been marketed under the tradenames COOLER VISIONS™; DIRECT E-CIG™; DRAGONFLY™; EMIST™; EVERSMOKE™; GAMUCCI®; HYBRID FLAME™; KNIGHT STICKS™; ROYAL BLUES™; SMOKETIP®; and SOUTH BEACH SMOKE™.

Articles that produce the taste and sensation of smoking by electrically heating tobacco or tobacco derived materials have suffered from inconsistent performance characteristics. Accordingly, it is desirable to provide a smoking article that can provide the sensations of cigarette, cigar, or pipe smoking, without substantial combustion, and that does so with advantageous performance characteristics.

BRIEF SUMMARY

In various implementations, the present disclosure provides an aerosol delivery device and an aerosol source member for use with an aerosol delivery device. The present disclosure includes, without limitation, the following example implementations:

An aerosol delivery device comprising a control body having a housing, a resonant transmitter located in the control body, a control component configured to drive the resonant transmitter, and an aerosol source member that includes a substrate portion at least a portion of which is configured to be positioned within range of a field emitted by the resonant transmitter, wherein the substrate portion includes a substrate material and one or more separators, wherein the one or more separators are configured to separate the substrate material into a plurality of separate substrate segments, and wherein the one or more separators comprise one or more susceptors configured to be heated by the resonant transmitter.

The aerosol delivery device of any preceding example implementation, or any combination of any preceding example implementations, wherein the one or more separators separate the substrate material into a plurality of separate longitudinal substrate segments.

The aerosol delivery device of any preceding example implementation, or any combination of any preceding example implementations, wherein the one or more separators separate the substrate material into a plurality of separate radial substrate segments.

The aerosol delivery device of any preceding example implementation, or any combination of any preceding example implementations, wherein the one or more separators separate the substrate material into a plurality of longitudinal substrate segments and a plurality of radial substrate segments.

The aerosol delivery device of any preceding example implementation, or any combination of any preceding example implementations, wherein at least one of the one or more separators comprises a conductive porous disk.

The aerosol delivery device of any preceding example implementation, or any combination of any preceding example implementations, wherein at least one of the one or more separators comprises a conductive spiral coil.

The aerosol delivery device of any preceding example implementation, or any combination of any preceding example implementations, wherein at least one of the one or more separators comprises a conductive gathered web.

The aerosol delivery device of any preceding example implementation, or any combination of any preceding example implementations, wherein the conductive gathered web comprises a multilayer sheet.

The aerosol delivery device of any preceding example implementation, or any combination of any preceding example implementations, wherein the multilayer sheet includes an aerosol precursor composition.

The aerosol delivery device of any preceding example implementation, or any combination of any preceding example implementations, wherein the substrate material includes a plurality of conductive particles mixed therein, and wherein the plurality of conductive particles comprise supplemental susceptors configured to be heated by the resonant transmitter.

The aerosol delivery device of any preceding example implementation, or any combination of any preceding example implementations, wherein the resonant transmitter and the one or more separators are configured for segmented heating of the substrate material.

An aerosol source member for use with an inductive heating aerosol delivery device that includes a resonant transmitter, the aerosol source member comprising a substrate portion comprising a substrate material and one or more separators, wherein at least a portion of the substrate portion is configured to be positioned within range of a field emitted by the resonant transmitter, wherein the one or more separators are configured to separate the substrate material into a plurality of separate substrate segments, and wherein the one or more separators comprise susceptors configured to be heated by the resonant transmitter.

The aerosol source member of any preceding example implementation, or any combination of any preceding example implementations, wherein the one or more separators separate the substrate material into a plurality of separate longitudinal substrate segments.

The aerosol source member of any preceding example implementation, or any combination of any preceding example implementations, wherein the one or more separators separate the substrate material into a plurality of separate radial substrate segments.

The aerosol source member of any preceding example implementation, or any combination of any preceding example implementations, wherein the one or more separators separate the substrate material into a plurality of longitudinal substrate segments and a plurality of radial substrate segments.

The aerosol source member of any preceding example implementation, or any combination of any preceding example implementations, wherein the substrate material includes an aerosol precursor composition.

The aerosol source member of any preceding example implementation, or any combination of any preceding example implementations, wherein at least one of the one or more separators comprises a conductive porous disk.

The aerosol source member of any preceding example implementation, or any combination of any preceding example implementations, wherein at least one of the one or more separators comprises a conductive spiral coil.

The aerosol source member of any preceding example implementation, or any combination of any preceding example implementations, wherein at least one of the one or more separators comprises a conductive gathered web.

The aerosol source member of any preceding example implementation, or any combination of any preceding example implementations, wherein the conductive gathered web comprises a multilayer sheet.

The aerosol source member of any preceding example implementation, or any combination of any preceding example implementations, wherein the multilayer sheet includes an aerosol precursor composition.

The aerosol source member of any preceding example implementation, or any combination of any preceding example implementations, wherein the substrate material includes a plurality of conductive particles mixed therein, and wherein the plurality of conductive particles comprise supplemental susceptors configured to be heated by the resonant transmitter.

The aerosol source member of any preceding example implementation, or any combination of any preceding example implementations, wherein the substrate material comprises cut filler tobacco material.

The aerosol source member of any preceding example implementation, or any combination of any preceding example implementations, wherein the tobacco material comprises an extruded tobacco material.

The aerosol source member of any preceding example implementation, or any combination of any preceding example implementations, wherein the substrate material comprises a reconstituted tobacco sheet material.

The aerosol source member of any preceding example implementation, or any combination of any preceding example implementations, wherein the tobacco substrate comprises one or more of tobacco beads and tobacco powder.

The aerosol source member of any preceding example implementation, or any combination of any preceding example implementations, wherein the one or more separators are configured for segmented heating of the substrate material.

The aerosol source member of any preceding example implementation, or any combination of any preceding example implementations, wherein the substrate material includes an aerosol precursor composition.

The aerosol delivery device of any preceding example implementation, or any combination of any preceding example implementations, wherein at least one of the one or more separators comprises a material selected from a cobalt material, an iron material, a nickel material, a zinc material, a manganese material, a stainless steel material, a ceramic material, a silicon carbide material, a carbon material, and combinations thereof.

The aerosol delivery device of any preceding example implementation, or any combination of any preceding example implementations, wherein the conductive particles comprise a material selected from a cobalt material, an iron material, a nickel material, a zinc material, a manganese material, a stainless steel material, a ceramic material, a silicon carbide material, a carbon material, and combinations thereof.

The aerosol delivery device of any preceding example implementation, or any combination of any preceding example implementations, wherein the substrate material comprises cut filler tobacco material.

The aerosol delivery device of any preceding example implementation, or any combination of any preceding example implementations, wherein the substrate material comprises an extruded tobacco material.

The aerosol delivery device of any preceding example implementation, or any combination of any preceding example implementations, wherein the substrate material comprises a reconstituted tobacco sheet material.

The aerosol delivery device of any preceding example implementation, or any combination of any preceding example implementations, wherein the substrate material comprises one or more of tobacco beads and tobacco powder.

The aerosol source member of any preceding example implementation, or any combination of any preceding example implementations, wherein at least one of the one or more separators comprises a material selected from a cobalt material, an iron material, a nickel material, a zinc material, a manganese material, a stainless steel material, a ceramic material, a silicon carbide material, a carbon material, and combinations thereof.

The aerosol source member of any preceding example implementation, or any combination of any preceding example implementations, wherein the conductive particles comprise a material selected from a cobalt material, an iron material, a nickel material, a zinc material, a manganese material, a stainless steel material, a ceramic material, a silicon carbide material, a carbon material, and combinations thereof.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise.

BRIEF DESCRIPTION OF THE DRAWINGS

Figure 1:
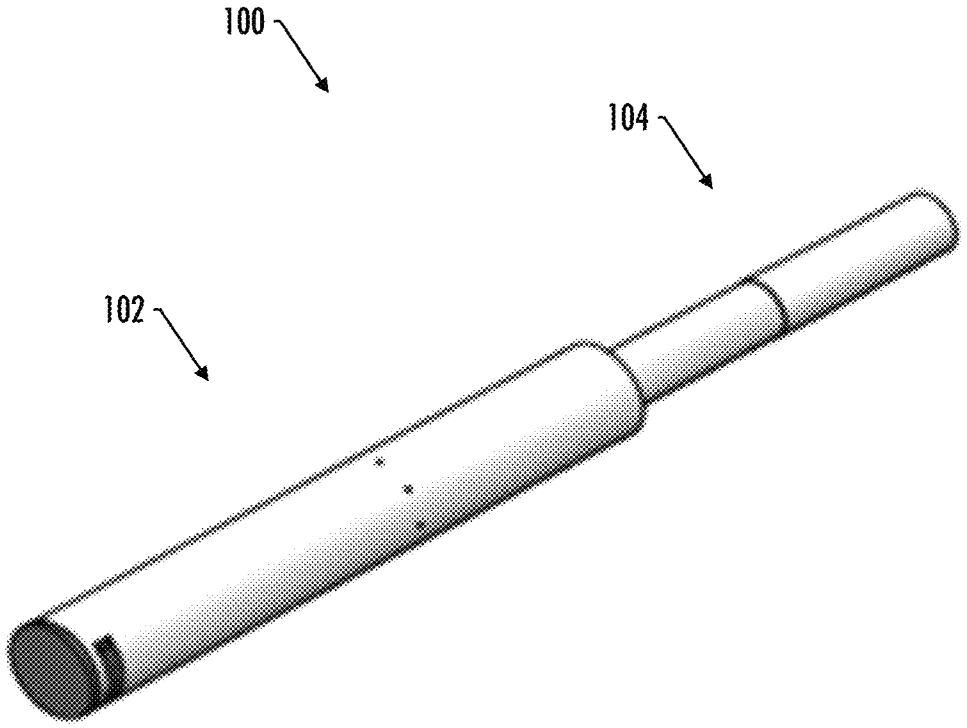
Figure 2:
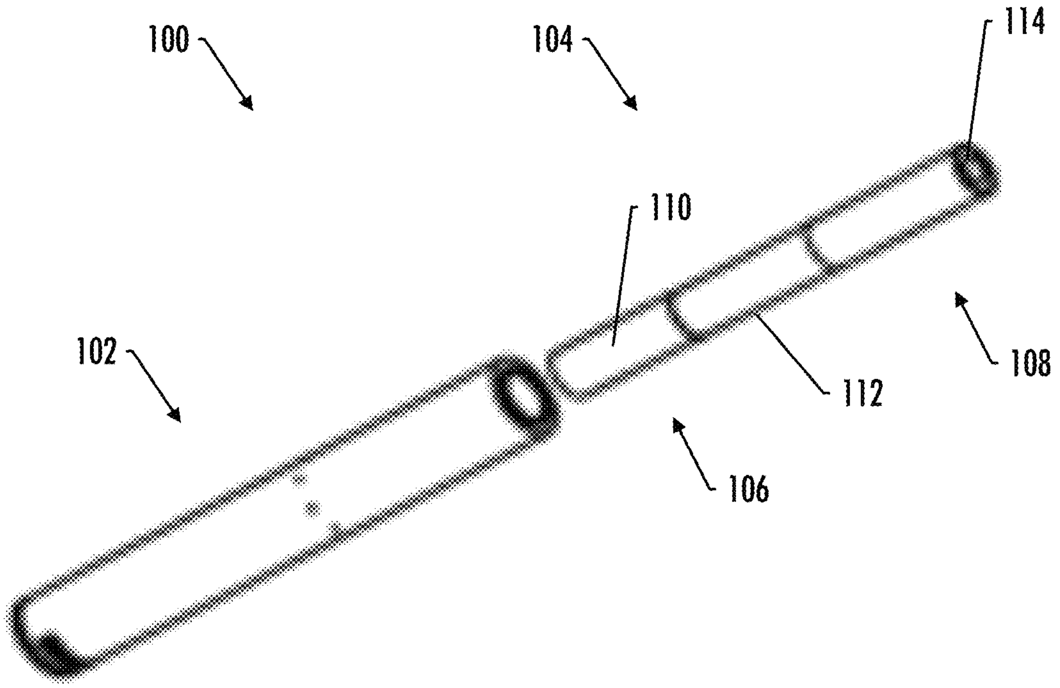
Figure 3:
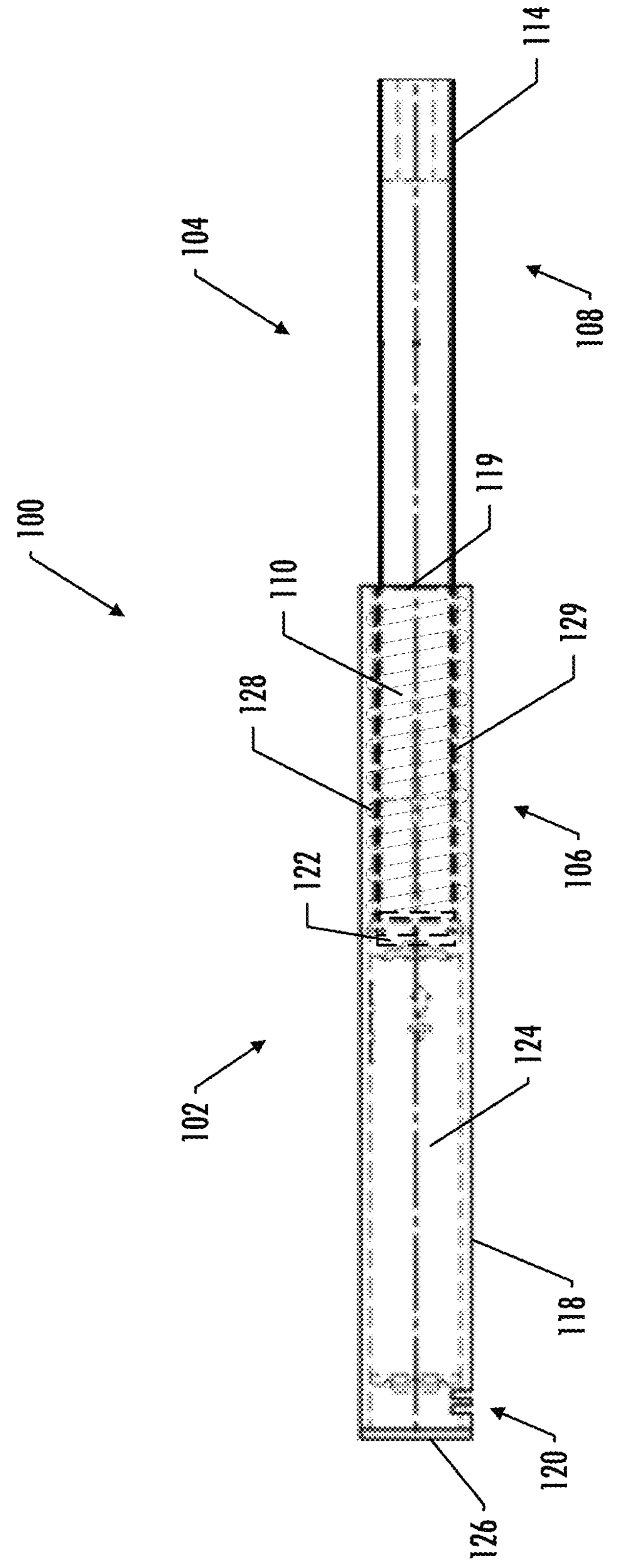
Figure 4:
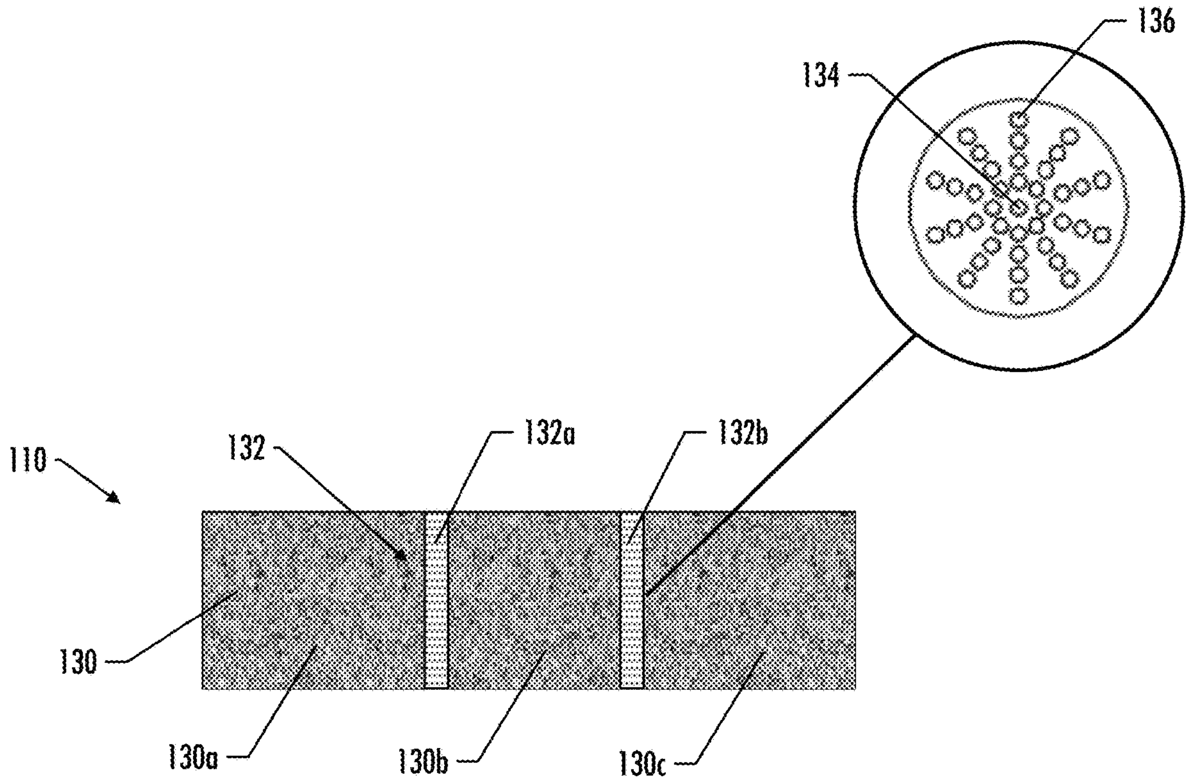
Figure 5:
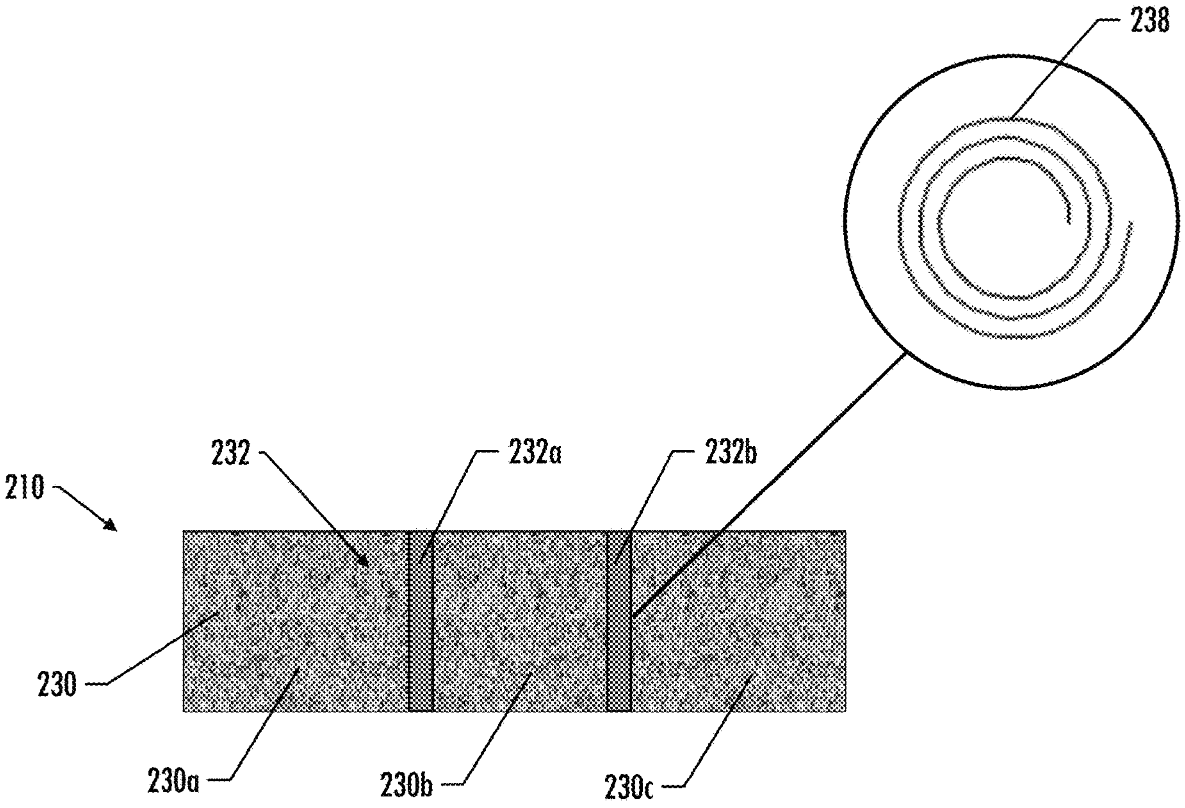
Figure 6:
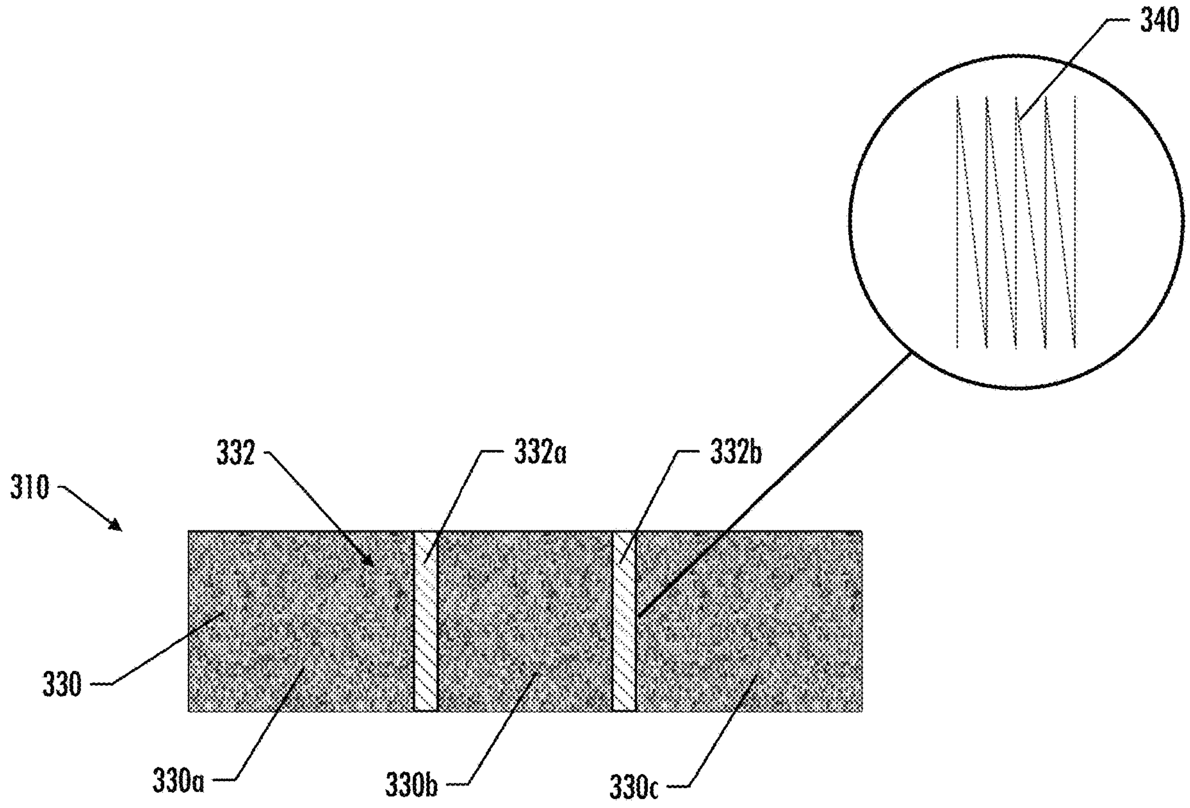
Figure 7A:
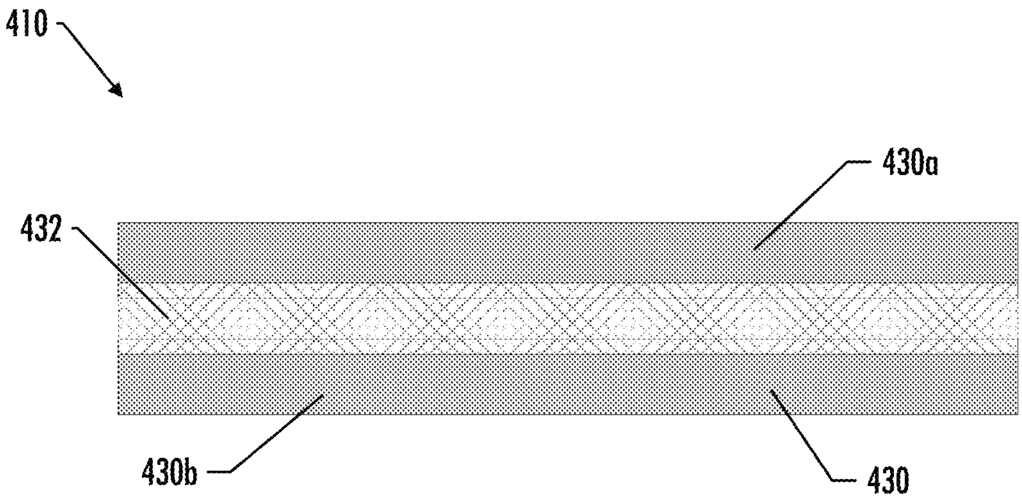
Figure 7B:
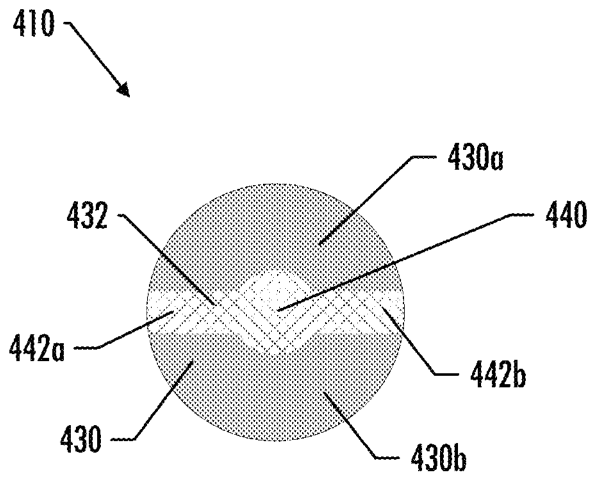
Figure 8A:
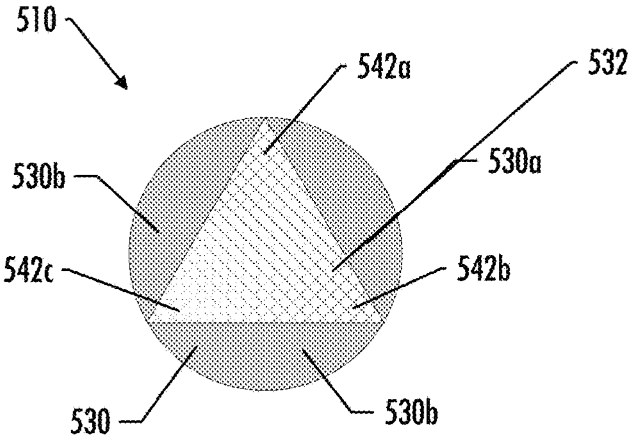
Figure 8B:
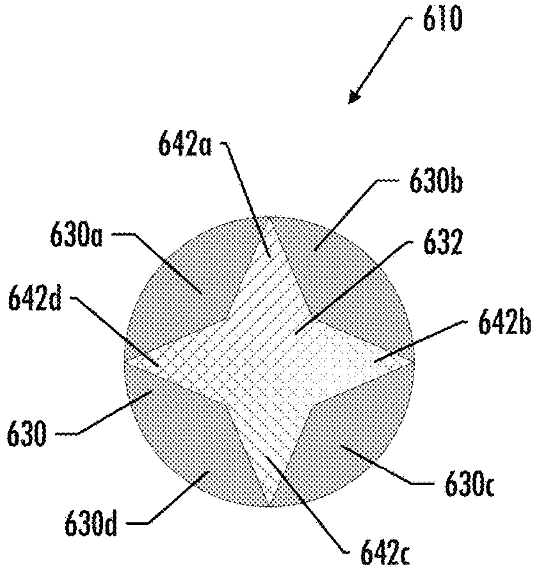
Figure 8C:
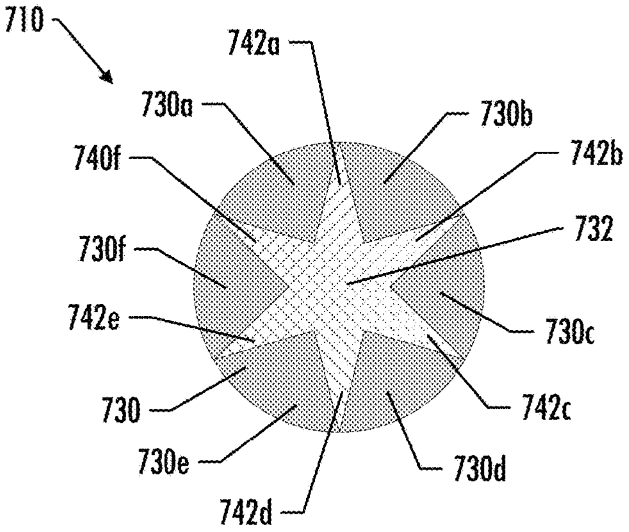

Having thus described the disclosure in the foregoing general terms, reference will now be made to the accompanying drawings, which are not necessarily drawn to scale, and wherein:

FIG. 1 illustrates a perspective view of an aerosol delivery device comprising a control body and an aerosol source member, wherein the aerosol source member and the control body are coupled to one another according to an example implementation of the present disclosure;

FIG. 2 illustrates a perspective view of the aerosol delivery device of FIG. 1 wherein the aerosol source member and the control body are decoupled from one another according to an example implementation of the present disclosure;

FIG. 3 illustrates a front schematic view of an aerosol delivery device, according to an example implementation of the present disclosure;

FIG. 4 illustrates a schematic view of a substrate portion of an aerosol source member, according to an example implementation of the present disclosure;

FIG. 5 illustrates a schematic view of a substrate portion of an aerosol source member, according to an example implementation of the present disclosure;

FIG. 6 illustrates a schematic view of a substrate portion of an aerosol source member, according to an example implementation of the present disclosure;

FIG. 7A illustrates a schematic view of a substrate portion of an aerosol source member, according to an example implementation of the present disclosure;

FIG. 7B illustrates a schematic transverse cross-section of the substrate portion of FIG. 7A, according to an example implementation of the present disclosure;

FIG. 8A illustrates a schematic transverse cross-section of a substrate portion of an aerosol source member, according to an example implementation of the present disclosure;

FIG. 8B illustrates a schematic transverse cross-section of a substrate portion of an aerosol source member, according to an example implementation of the present disclosure; and FIG. 8C illustrates a schematic transverse cross-section of a substrate portion of an aerosol source member, according to an example implementation of the present disclosure.

DETAILED DESCRIPTION

The present disclosure will now be described more fully hereinafter with reference to example implementations thereof. These example implementations are described so that this disclosure will be thorough and complete, and will fully convey the scope of the disclosure to those skilled in the art. Indeed, the disclosure may be embodied in many different forms and should not be construed as limited to the implementations set forth herein; rather, these implementations are provided so that this disclosure will satisfy applicable legal requirements. As used in the specification and the appended claims, the singular forms "a," "an," "the" and the like include plural referents unless the context clearly dictates otherwise. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As described hereinafter, example implementations of the present disclosure relate to aerosol delivery devices. Aerosol delivery devices according to the present disclosure use electrical energy to heat a material (preferably without combusting the material to any significant degree) to form an inhalable substance; and components of such systems have the form of articles most preferably are sufficiently compact to be considered hand-held devices. That is, use of components of preferred aerosol delivery devices does not result in the production of smoke in the sense that aerosol results principally from by-products of combustion or pyrolysis of tobacco, but rather, use of those preferred systems results in the production of vapors resulting from volatilization or vaporization of certain components incorporated therein. In some example implementations, components of aerosol delivery devices may be characterized as electronic cigarettes, and those electronic cigarettes most preferably incorporate tobacco and/or components derived from tobacco, and hence deliver tobacco derived components in aerosol form.

Aerosol generating components of certain preferred aerosol delivery devices may provide many of the sensations (e.g., inhalation and exhalation rituals, types of tastes or flavors, organoleptic effects, physical feel, use rituals, visual cues such as those provided by visible aerosol, and the like) of smoking a cigarette, cigar or pipe that is employed by lighting and burning tobacco (and hence inhaling tobacco smoke), without any substantial degree of combustion of any component thereof. For example, the user of an aerosol delivery device in accordance with some example implementations of the present disclosure can hold and use that component much like a smoker employs a traditional type of smoking article, draw on one end of that piece for inhalation of aerosol produced by that piece, take or draw puffs at selected intervals of time, and the like.

While the systems are generally described herein in terms of implementations associated with aerosol delivery devices such as so-called "e-cigarettes" or "tobacco heating products," it should be understood that the mechanisms, components, features, and methods may be embodied in many different forms and associated with a variety of articles. For example, the description provided herein may be employed in conjunction with implementations of traditional smoking articles (e.g., cigarettes, cigars, pipes, etc.), heat-not-burn cigarettes, and related packaging for any of the products disclosed herein. Accordingly, it should be understood that the description of the mechanisms, components, features, and methods disclosed herein are discussed in terms of implementations relating to aerosol delivery devices by way of example only, and may be embodied and used in various other products and methods.

Aerosol delivery devices of the present disclosure may also be characterized as being vapor-producing articles or medicament delivery articles. Thus, such articles or devices may be adapted so as to provide one or more substances (e.g., flavors and/or pharmaceutical or nutraceutical active ingredients) in an inhalable form or state. For example, inhalable substances may be substantially in the form of a vapor (i.e., a substance that is in the gas phase at a temperature lower than its critical point). Alternatively, inhalable substances may be in the form of an aerosol (i.e., a suspension of fine solid particles or liquid droplets in a gas). For purposes of simplicity, the term "aerosol" as used herein is meant to include vapors, gases and aerosols of a form or type suitable for human inhalation, whether or not visible, and whether or not of a form that might be considered to be smoke-like. The physical form of the inhalable substance is not necessarily limited by the nature of the inventive devices but rather may depend upon the nature of the medium and the inhalable substance itself as to whether it exists in a vapor state or an aerosol state. In some implementations, the terms "vapor" and "aerosol" may be interchangeable. Thus, for simplicity, the terms "vapor" and "aerosol" as used to describe aspects of the disclosure are understood to be interchangeable unless stated otherwise.

In use, aerosol delivery devices of the present disclosure may be subjected to many of the physical actions employed by an individual in using a traditional type of smoking article (e.g., a cigarette, cigar or pipe that is employed by lighting and inhaling tobacco). For example, the user of an aerosol delivery device of the present disclosure can hold that article much like a traditional type of smoking article, draw on one end of that article for inhalation of aerosol produced by that article, take puffs at selected intervals of time, etc.

Aerosol delivery devices of the present disclosure generally include a number of components provided within an outer body or shell, which may be referred to as a housing. The overall design of the outer body or shell can vary, and the format or configuration of the outer body that can define the overall size and shape of the aerosol delivery device can vary. Typically, an elongated body resembling the shape of a cigarette or cigar can be a formed from a single, unitary housing or the elongated housing can be formed of two or more separable bodies. For example, an aerosol delivery device can comprise an elongated shell or body that can be substantially tubular in shape and, as such, resemble the shape of a conventional cigarette or cigar. In another example, an aerosol delivery device may be substantially rectangular or have a substantially rectangular cuboid shape. In one example, all of the components of the aerosol delivery device are contained within one housing. Alternatively, an aerosol delivery device can comprise two or more housings that are joined and are separable. For example, an aerosol delivery device can possess at one end a control body comprising a housing containing one or more reusable components (e.g., an accumulator such as a rechargeable battery and/or rechargeable supercapacitor, and various electronics for controlling the operation of that article), and at the other end and removably coupleable thereto, an outer body or shell containing a disposable portion (e.g., a disposable flavor-containing cartridge containing aerosol precursor material, flavorant, etc.). More specific formats, configurations and arrangements of components within the single housing type of unit or within a multi-piece separable housing type of unit will be evident in light of the further disclosure provided herein. Additionally, various aerosol delivery device designs and component arrangements can be appreciated upon consideration of the commercially available electronic aerosol delivery devices.

As will be discussed in more detail below, aerosol delivery devices of the present disclosure comprise some combination of a power source (e.g., an electrical power source), at least one control component (e.g., means for actuating, controlling, regulating and ceasing power for heat generation, such as by controlling electrical current flow from the power source to other components of the article—e.g., a microprocessor, individually or as part of a microcontroller), a heater or heat generation member (e.g., an electrical resistance heating element or other component and/or an inductive coil or other associated components and/or one or more radiant heating elements), and an aerosol source member that includes or comprises a substrate portion capable of yielding an aerosol upon application of sufficient heat. In some implementations, the aerosol source member may include a mouth end or tip configured to allow drawing upon the aerosol delivery device for aerosol inhalation (e.g., a defined airflow path through the article such that aerosol generated can be withdrawn therefrom upon draw). In other implementations, a control body may include a mouthpiece configured to allow drawing upon for aerosol inhalation.

Alignment of the components within the aerosol delivery device of the present disclosure can vary. In specific implementations, the aerosol source member or substrate portion of the aerosol source member may be positioned proximate a heating member so as to maximize aerosol delivery to the user. Other configurations, however, are not excluded. Generally, the heating member may be positioned sufficiently near the aerosol source member or substrate portion of the aerosol source member so that heat from the heating member can volatilize the aerosol source member or substrate portion of the aerosol source member (as well as, in some implementations, one or more flavorants, medicaments, or the like that may likewise be provided for delivery to a user) and form an aerosol for delivery to the user. When the heating member heats the aerosol source member or substrate portion of the aerosol source member, an aerosol is formed, released, or generated in a physical form suitable for inhalation by a consumer. It should be noted that the foregoing terms are meant to be interchangeable such that reference to release, releasing, releases, or released includes form or generate, forming or generating, forms or generates, and formed or generated. Specifically, an inhalable substance is released in the form of a vapor or aerosol or mixture thereof, wherein such terms are also interchangeably used herein except where otherwise specified.

As noted above, the aerosol delivery device of various implementations may incorporate a power source (e.g., a battery or other electrical power source) to provide current flow sufficient to provide various functionalities to the aerosol delivery device, such as powering of a heating member, powering of an induction coil, powering of control systems, powering of indicators, and the like. The power source can take on various implementations. Preferably, the power source is able to deliver sufficient power to rapidly activate the heating source to provide for aerosol formation and power the aerosol delivery device through use for a desired duration of time. The power source preferably is sized to fit conveniently within the aerosol delivery device so that the aerosol delivery device can be easily handled. Additionally, a preferred power source is of a sufficiently light weight to not detract from a desirable smoking experience.

More specific formats, configurations and arrangements of components within the aerosol delivery device of the present disclosure will be evident in light of the further disclosure provided hereinafter. Additionally, the selection of various aerosol delivery device components can be appreciated upon consideration of the commercially available electronic aerosol delivery devices. Further, the arrangement of the components within the aerosol delivery device can also be appreciated upon consideration of the commercially available electronic aerosol delivery devices.

As noted, aerosol delivery devices may be configured to heat an aerosol source member or a substrate portion of an aerosol source member to produce an aerosol. In some implementations, the aerosol delivery devices may comprise heat-not-burn devices, configured to heat an extruded structure and/or substrate, a substrate material associated with an aerosol precursor composition, tobacco and/or a tobacco-derived material (i.e., a material that is found naturally in tobacco that is isolated directly from the tobacco or synthetically prepared) in a solid or liquid form (e.g., beads, shreds, a wrap, a fibrous sheet or paper), or the like. Such aerosol delivery devices may include so-called electronic cigarettes.

Regardless of the type of substrate material heated, some aerosol delivery devices may include a heating member configured to heat the aerosol source member or substrate portion of the aerosol source member. In some devices, the heating member may comprise a resistive heating member. Resistive heating members may be configured to produce heat when an electrical current is directed therethrough. Such heating members often comprise a metal material and are configured to produce heat as a result of the electrical resistance associated with passing an electrical current therethrough. Such resistive heating members may be positioned in proximity to the aerosol source member or substrate portion of the aerosol source member. Alternatively, the heating member may be positioned in contact with a solid or semi-solid aerosol precursor composition. Such configurations may heat the aerosol source member or substrate portion of the aerosol source member to produce an aerosol. Representative types of solid and semi-solid aerosol precursor compositions and formulations are disclosed in U.S. Pat. No. 8,424,538 to Thomas et al.; U.S. Pat. No. 8,464,726 to Sebastian et al.; U.S. Pat. App. Pub. No. 2015/0083150 to Conner et al.; U.S. Pat. App. Pub. No. 2015/0157052 to Ademe et al.; and U.S. Pat. App. Pub. No. 2017/0000188 to Nordskog et al., all of which are incorporated by reference herein.

In the depicted implementations, however, an inductive heating arrangement is used. In various implementations, the inductive heating arrangement may comprise a resonant transmitter and a resonant receiver (e.g., one or more susceptors). In such a manner, operation of the aerosol delivery device may require directing alternating current to the resonant transmitter to produce an oscillating magnetic field in order to induce eddy currents in a resonant receiver. In various implementations, the resonant receiver may be part of the aerosol source member or substrate portion of the aerosol source member and/or may be disposed proximate an aerosol source member or substrate portion of an aerosol source member. This alternating current causes the resonant receiver to generate heat and thereby creates an aerosol from the aerosol source member. Examples of various inductive heating methods and configurations are described in U.S. Pat. App. Pub. No. 2019/0124979 to Sebastian et al., which is incorporated by reference herein in its entirety. Further examples of various induction-based control components and associated circuits are described in U.S. Pat. App. Pub. No. 2018/0132531, and U.S. Patent App. Pub. No. 2017/

0202266 to Sur et al., each of which is incorporated herein by reference in its entirety. It should be noted that although the depicted implementations describe a single resonant transmitter, in other implementations, there may be multiple independent resonant transmitters, such as, for example, implementations having segmented inductive heating arrangements.

In some implementations the control component of the control body may include an inverter or an inverter circuit configured to transform direct current provided by the power source to alternating current that is provided to the resonant transmitter. As such, in some implementations a resonant transmitter (such as, for example, a coil member) and an aerosol source member may be positioned proximate each other to heat the aerosol source member or a portion thereof (e.g., the substrate portion) by inductive heating. For example, in some implementations the substrate portion may be positioned within range of a field emitted by the resonant transmitter. As will be described in more detail below, a portion of the inductive heating arrangement may be positioned in the control body and a portion of the inductive heating arrangement may be positioned in the aerosol source member.

FIG. 1 illustrates an aerosol delivery device 100 according to an example implementation of the present disclosure. The aerosol delivery device 100 may include a control body 102 and an aerosol source member 104. In various implementations, the aerosol source member 104 and the control body 102 can be permanently or detachably aligned in a functioning relationship. In this regard, FIG. 1 illustrates the aerosol delivery device 100 in a coupled configuration, whereas FIG. 2 illustrates the aerosol delivery device 100 in a decoupled configuration. Various mechanisms may connect the aerosol source member 104 to the control body 102 to result in a threaded engagement, a press-fit engagement, an interference fit, a sliding fit, a magnetic engagement, or the like. In various implementations, the control body 102 of the aerosol delivery device 100 may be substantially rod-like, substantially tubular shaped, substantially rectangular or rectangular cuboidal shaped, or substantially cylindrically shaped. In other implementations, the control body may take another hand-held shape, such as a small box shape, various pod mod (e.g., all-in-one) shapes, or a fob-shape.

Although the depicted implementation shows an aerosol source member that extends outside of a control body, it should be noted that the present invention should not be so limited. In other implementations, for example, an aerosol source member may be fully received and/or concealed within a control body. In particular, in some implementations an aerosol source member may be fully received into a receiving compartment or chamber of a control body. In some implementations, there need not be a mouthpiece, and in other implementations the mouthpiece may be separate (and, in some implementations, may be reusable). In addition, in some implementations the aerosol source member may comprise a substrate portion and need not include a filter or other segments or sections.

In specific implementations, one or both of the control body 102 and the aerosol source member 104 may be referred to as being disposable or as being reusable. For example, the control body 102 may have a replaceable battery or a rechargeable battery, solid-state battery, thin-film solid-state battery, rechargeable supercapacitor or the like, and thus may be combined with any type of recharging technology, including connection to a wall charger, connection to a car charger (i.e., cigarette lighter receptacle), and connection to a computer, such as through a universal serial bus (USB) cable or connector (e.g., USB 2.0, 3.0, 3.1, USB Type-C), connection to a photovoltaic cell (sometimes referred to as a solar cell) or solar panel of solar cells, a wireless charger, such as a charger that uses inductive wireless charging (including for example, wireless charging according to the Qi wireless charging standard from the Wireless Power Consortium (WPC)), or a wireless radio frequency (RF) based charger. An example of an inductive wireless charging system is described in U.S. Pat. App. Pub. No. 2017/0112196 to Sur et al., which is incorporated herein by reference in its entirety. Further, in some implementations, the aerosol source member 104 may comprise a single-use device. A single use component for use with a control body is disclosed in U.S. Pat. No. 8,910,639 to Chang et al., which is incorporated herein by reference in its entirety. In some implementations, the control body 102 may be inserted into and/or coupled with a separate charging station for charging a rechargeable battery of the device 100. In some implementations, the charging station itself may include a rechargeable power source that recharges the rechargeable battery of the device 100.

Referring to FIG. 2, which illustrates a perspective view of the aerosol delivery device 100 of FIG. 1 wherein the aerosol source member 104 and the control body 102 are decoupled from one another, the aerosol source member 104 of some implementations may comprise a heated end 106, which is configured to be inserted into the control body 102, and a mouth end 108, upon which a user draws to create the aerosol. In various implementations, at least a portion of the heated end 106 may include a substrate portion 110. It should be noted that in other implementations, the aerosol source member 104 need not include a heated end and/or a mouth end.

In some implementations, the substrate portion 110 may comprise tobacco-containing beads, tobacco powder, tobacco shreds, tobacco strips, reconstituted tobacco material, a cast tobacco sheet, or combinations thereof, and/or a mix of finely ground tobacco, tobacco extract, spray dried tobacco extract, or other tobacco form mixed with optional inorganic materials (such as calcium carbonate), rice flour, corn flour, carboxymethyl cellulose (CMC), guar gum, alginate, optional flavors, and aerosol forming materials to form a substantially solid or moldable (e.g., extrudable) substrate. In various implementations, the aerosol source member 104, or a portion thereof, may be wrapped in an overwrap material 112, which may be formed of any material useful for providing additional structure and/or support for the aerosol source member 104. In various implementations, the overwrap material may comprise a material that resists transfer of heat, which may include a paper or other fibrous material, such as a cellulose material. The overwrap material may also include at least one filler material imbedded or dispersed within the fibrous material. In various implementations, the filler material may have the form of water insoluble particles. Additionally, the filler material can incorporate inorganic components. In various implementations, the overwrap may be formed of multiple layers, such as an underlying, bulk layer and an overlying layer, such as a typical wrapping paper in a cigarette. Such materials may include, for example, lightweight "rag fibers" such as flax, hemp, sisal, rice straw, and/or esparto.

Referring to FIG. 3, which illustrates a front schematic view of an aerosol delivery device 100, the mouth end 108 of the aerosol source member 104 of some implementations may include a filter 114, which, for example, may be made of a cellulose acetate or polypropylene material. In various implementations, the filter 114 may increase the structural integrity of the mouth end 108 of the aerosol source member 100, and/or provide filtering capacity, if desired, and/or provide resistance to draw. In some implementations, the filter may be separate from the overwrap, and the filter may be held in position by the overwrap. In some implementations, the filter may comprise discrete segments. For example, some implementations may include a segment providing filtering, a segment providing draw resistance, a hollow segment providing a space for the aerosol to cool, a segment providing increased structural integrity, other filter segments, or any one or any combination of the above. In various implementations other components may exist between the substrate portion 110 and the mouth end 108 of the aerosol source member 104, wherein the mouth end 108 may include a filter 114. For example, in some implementations one or any combination of the following may be positioned between the substrate portion and the mouth end: an air gap; phase change materials for cooling air; flavor releasing media; ion exchange fibers capable of selective chemical adsorption; aerogel particles as filter medium; and other suitable materials.

Exemplary types of overwrapping materials, wrapping material components, and treated wrapping materials that may be used in overwrap in the present disclosure are described in U.S. Pat. No. 5,105,838 to White et al.; U.S. Pat. No. 5,271,419 to Arzonico et al.; U.S. Pat. No. 5,220,930 to Gentry; U.S. Pat. No. 6,908,874 to Woodhead et al.; U.S. Pat. No. 6,929,013 to Ashcraft et al.; U.S. Pat. No. 7,195,019 to Hancock et al.; U.S. Pat. No. 7,276,120 to Holmes; U.S. Pat. No. 7,275,548 to Hancock et al.; PCT WO 01/08514 to Fournier et al.; and PCT WO 03/043450 to Hajaligol et al., which are incorporated herein by reference in their entireties. Representative wrapping materials are commercially available as R. J. Reynolds Tobacco Company Grades 119, 170, 419, 453, 454, 456, 465, 466, 490, 525, 535, 557, 652, 664, 672, 676 and 680 from Schweitzer-Maudit International. The porosity of the wrapping material can vary, and frequently is between about 5 CORESTA units and about 30,000 CORESTA units, often is between about 10 CORESTA units and about 90 CORESTA units, and frequently is between about 8 CORESTA units and about 80 CORESTA units.

To maximize aerosol and flavor delivery which otherwise may be diluted by radial (i.e., outside) air infiltration through the overwrap, one or more layers of non-porous cigarette paper may be used to envelop the aerosol source member 104 (with or without the overwrap present). Examples of suitable non-porous cigarette papers are commercially available from Kimberly-Clark Corp. as KC-63-5, P878-5, P878-16-2 and 780-63-5. Preferably, the overwrap is a material that is substantially impermeable to the vapor formed during use of the inventive article. If desired, the overwrap can comprise a resilient paperboard material, foil-lined paperboard, metal, polymeric materials, or the like, and this material can be circumscribed by a cigarette paper wrap. The overwrap may comprise a tipping paper that circumscribes the component and optionally may be used to attach a filter material to the aerosol source member, as otherwise described herein.

As noted above, various implementations of the present disclosure employ an inductive heating arrangement to heat an aerosol source member or substrate portion of an aerosol source member. The inductive heating arrangement may comprise at least one resonant transmitter and at least one resonant receiver (hereinafter also referred to as a susceptor or a plurality of susceptor particles). In various implementations, one or both of the resonant transmitter and the resonant receiver may be located in the control body and/or the aerosol source member. As will be described in more detail below, the substrate portion of some implementations may include the resonant receiver. Examples of additional possible components are described in U.S. Pat. App. Pub. No. 2019/0124979, which is incorporated herein by reference in its entirety.

Referring back to FIG. 3, the control body 102 of the depicted implementation may comprise a housing 118 that includes an opening 119 defined in an engaging end thereof, a flow sensor 120 (e.g., a puff sensor or pressure switch), a control component 122 (e.g., a microprocessor, individually or as part of a microcontroller, a printed circuit board (PCB) that includes a microprocessor and/or microcontroller, etc.), a power source 124 (e.g., a battery, which may be rechargeable, and/or a rechargeable supercapacitor), and an end cap that may include an indicator 126 (e.g., a light emitting diode (LED)).

Examples of possible power sources are described in U.S. Pat. No. 9,484,155 to Peckerar et al., and U.S. Pat. App. Pub. No. 2017/0112191 to Sur et al., filed Oct. 21, 2015, the disclosures of which are incorporated herein by reference in their respective entireties. With respect to the flow sensor 120, representative current regulating components and other current controlling components including various microcontrollers, sensors, and switches for aerosol delivery devices are described in U.S. Pat. No. 4,735,217 to Gerth et al., U.S. Pat. Nos. 4,922,901, 4,947,874, and 4,947,875, all to Brooks et al., U.S. Pat. No. 5,372,148 to McCafferty et al., U.S. Pat. No. 6,040,560 to Fleischhauer et al., U.S. Pat. No. 7,040,314 to Nguyen et al., and U.S. Pat. No. 8,205,622 to Pan, all of which are incorporated herein by reference in their entireties. Reference also is made to the control schemes described in U.S. Pat. No. 9,423,152 to Ampolini et al., which is incorporated herein by reference in its entirety. In one implementation, the indicator 126 may comprise one or more light emitting diodes, quantum dot-based light emitting diodes or the like. The indicator 126 can be in communication with the control component 122 and be illuminated, for example, when a user draws on the aerosol source member 104, when coupled to the control body 102, as detected by the flow sensor 120.

In some implementations, an input element may be included with the aerosol delivery device (and may replace or supplement an airflow or pressure sensor). The input may be included to allow a user to control functions of the device and/or for output of information to a user. Any component or combination of components may be utilized as an input for controlling the function of the device. For example, one or more pushbuttons may be used as described in U.S. Pub. No. 2015/0245658 to Worm et al., which is incorporated herein by reference. Likewise, a touchscreen may be used as described in U.S. Pat. App. Pub. No. 2016/0262454, to Sears et al., which is incorporated herein by reference. As a further example, components adapted for gesture recognition based on specified movements of the aerosol delivery device may be used as an input. See U.S. Pat. App. Pub. No. 2016/0158782 to Henry et al., which is incorporated herein by reference. As still a further example, a capacitive sensor may be implemented on the aerosol delivery device to enable a user to provide input, such as by touching a surface of the device on which the capacitive sensor is implemented.

Still further components can be utilized in the aerosol delivery device of the present disclosure. For example, U.S. Pat. No. 5,154,192 to Sprinkel et al. discloses indicators for smoking articles; U.S. Pat. No. 5,261,424 to Sprinkel, Jr. discloses piezoelectric sensors that can be associated with the mouth-end of a device to detect user lip activity associated with taking a draw and then trigger heating of a heating device; U.S. Pat. No. 5,372,148 to McCafferty et al. discloses a puff sensor for controlling energy flow into a heating load array in response to pressure drop through a mouthpiece; U.S. Pat. No. 5,967,148 to Harris et al. discloses receptacles in a smoking device that include an identifier that detects a non-uniformity in infrared transmissivity of an inserted component and a controller that executes a detection routine as the component is inserted into the receptacle; U.S. Pat. No. 6,040,560 to Fleischhauer et al. describes a defined executable power cycle with multiple differential phases; U.S. Pat. No. 5,934,289 to Watkins et al. discloses photonic-optronic components; U.S. Pat. No. 5,954,979 to Counts et al. discloses means for altering draw resistance through a smoking device; U.S. Pat. No. 6,803,545 to Blake et al. discloses specific battery configurations for use in smoking devices; U.S. Pat. No. 7,293,565 to Griffen et al. discloses various charging systems for use with smoking devices; U.S. Pat. No. 8,402,976 to Fernando et al. discloses computer interfacing means for smoking devices to facilitate charging and allow computer control of the device; U.S. Pat. No. 8,689,804 to Fernando et al. discloses identification systems for smoking devices; and PCT Pat. App. Pub. No. WO 2010/003480 by Flick discloses a fluid flow sensing system indicative of a puff in an aerosol generating system; all of the foregoing disclosures being incorporated herein by reference in their entireties.

Other suitable current actuation/deactuation mechanisms may include a temperature actuated on/off switch or a lip pressure actuated switch, or a touch sensor (e.g., capacitive touch sensor) configured to sense contact between a user (e.g., mouth or fingers of user) and one or more surfaces of the aerosol delivery device. An example mechanism that can provide such puff-actuation capability includes a Model 163PC01D36 silicon sensor, manufactured by the MicroSwitch division of Honeywell, Inc., Freeport, Ill. With such sensor, the heating member may be activated rapidly by a change in pressure when the consumer draws on the device. In addition, flow sensing devices, such as those using hot-wire anemometry principles, may be used to cause the energizing of the heating assembly sufficiently rapidly after sensing a change in airflow. A further puff actuated switch that may be used is a pressure differential switch, such as Model No. MPL-502-V, range A, from Micro Pneumatic Logic, Inc., Ft. Lauderdale, Fla. Another suitable puff actuated mechanism is a sensitive pressure transducer (e.g., equipped with an amplifier or gain stage) which is in turn coupled with a comparator for detecting a predetermined threshold pressure. Yet another suitable puff actuated mechanism is a vane which is deflected by airflow, the motion of which vane is detected by a movement sensing means. Yet another suitable actuation mechanism is a piezoelectric switch. Also useful is a suitably connected Honeywell MicroSwitch Microbridge Airflow Sensor, Part No. AWM 2100V from MicroSwitch Division of Honeywell, Inc., Freeport, Ill. Further examples of demand-operated electrical switches that may be employed in a heating circuit according to the present disclosure are described in U.S. Pat. No. 4,735,217 to Gerth et al., which is incorporated herein by reference in its entirety. Other suitable differential switches, analog pressure sensors, flow rate sensors, or the like, will be apparent to the skilled artisan with the knowledge of the present disclosure. In some implementations, a pressure-sensing tube or other passage providing fluid connection between the puff actuated switch and aerosol source member may be included in the housing so that pressure changes during draw are readily identified by the switch. Other example puff actuation devices that may be useful according to the present disclosure are disclosed in U.S. Pat. Nos. 4,922,901, 4,947,874, and 4,947,874, all to Brooks et al., U.S. Pat. No. 5,372,148 to McCafferty et al., U.S. Pat. No. 6,040,560 to Fleischhauer et al., U.S. Pat. No. 7,040,314 to Nguyen et al., and U.S. Pat. No. 8,205,622 to Pan, all of which are incorporated herein by reference in their entireties.

Further examples of components related to electronic aerosol delivery articles and disclosing materials or components that may be used in the present article include U.S. Pat. No. 4,735,217 to Gerth et al.; U.S. Pat. No. 5,249,586 to Morgan et al.; U.S. Pat. No. 5,666,977 to Higgins et al.; U.S. Pat. No. 6,053,176 to Adams et al.; U.S. Pat. No. 6,164,287 to White; U.S. Pat No. 6,196,218 to Voges; U.S. Pat. No. 6,810,883 to Felter et al.; U.S. Pat. No. 6,854,461 to Nichols; U.S. Pat. No. 7,832,410 to Hon; U.S. Pat. No. 7,513,253 to Kobayashi; U.S. Pat. No. 7,896,006 to Hamano; U.S. Pat. No. 6,772,756 to Shayan; U.S. Pat. Nos. 8,156,944 and 8,375,957 to Hon; U.S. Pat. No. 8,794,231 to Thorens et al.; U.S. Pat. No. 8,851,083 to Oglesby et al.; U.S. Pat. No. 8,915,254 and 8,925,555 to Monsees et al.; U.S. Pat. No. 9,220,302 to DePiano et al.; U.S. Pat. App. Pub. Nos. 2006/0196518 and 2009/0188490 to Hon; U.S. Pat. App. Pub. No. 2010/0024834 to Oglesby et al.; U.S. Pat. App. Pub. No. 2010/0307518 to Wang; PCT Pat. App. Pub. No. WO 2010/091593 to Hon; and PCT Pat. App. Pub. No. WO 2013/089551 to Foo, each of which is incorporated herein by reference in its entirety. Further, U.S. Pat. App. Pub. No. 2017/0099877, discloses capsules that may be included in aerosol delivery devices and fob-shape configurations for aerosol delivery devices, and is incorporated herein by reference in its entirety. A variety of the materials disclosed by the foregoing documents may be incorporated into the present devices in various implementations, and all of the foregoing disclosures are incorporated herein by reference in their entireties.

As noted above, the heating member of the depicted implementation comprises an inductive heating arrangement. As such, in general the control body 102 of the implementation depicted in FIG. 3 includes a resonant transmitter and the aerosol source member 104 includes a resonant receiver (e.g., one or more susceptors), which together facilitate heating of at least a portion of the aerosol source member 104 (e.g., the substrate portion 110). Although in various implementations the resonant transmitter and/or the resonant receiver may take a variety of forms, in the particular implementation depicted in FIG. 3, the resonant transmitter comprises a helical coil 128 that, in some implementations may surround a support cylinder 129, although in other implementations there need not be a support cylinder. In various implementations, the resonant transmitter may be made of one or more conductive materials, including, for example, silver, gold, aluminum, brass, zinc, iron, nickel, and alloys of thereof, conductive ceramics e.g., yttrium-doped zirconia, indium tin oxide, yttrium doped titanate, etc, and any combination of the above. In the illustrated implementation, the helical coil 128 is made of a conductive metal material, such as copper. In further implementations, the helical coil may include a non-conductive insulating cover/wrap material. Such materials may include, for example, one or more polymeric materials, such as epoxy, silicon rubber, etc., which may be helpful for low temperature applications, or fiberglass, ceramics, refractory materials, etc., which may be helpful for high temperature applications.

As illustrated, the resonant transmitter 128 may extend proximate an engagement end of the housing 118, and may be configured to substantially surround the portion of the heated end 106 of the aerosol source member 104 that includes the substrate portion 110. In such a manner, the helical coil 128 of the illustrated implementation may define a generally tubular configuration. In some implementations, the support cylinder 129 may also define a tubular configuration and may be configured to support the helical coil 128 such that the helical coil 128 does not contact with the substrate portion 110. As such, the support cylinder 129 may comprise a nonconductive material, which may be substantially transparent to an oscillating magnetic field produced by the helical coil 128. In various implementations, the helical coil 128 may be imbedded in, or otherwise coupled to, the support cylinder 129. In the illustrated implementation, the helical coil 128 is engaged with an outer surface of the support cylinder 129; however, in other implementations, the coil may be positioned at an inner surface of the support cylinder, be fully imbedded in the support cylinder, or have some other configuration.

FIG. 4 illustrates a schematic view of a substrate portion 110 of an aerosol source member 104 according to an example implementation of the present disclosure. In the depicted implementation, the substrate portion 110 includes a substrate material 130 and one or more separators 132. Although other implementations may differ, the depicted implementation includes two separators 132*a*, 132*b*. In the depicted implementation, the separators 132 are configured to separate the substrate material 130 into a plurality (e.g., two or more) of separate longitudinal substrate segments. In particular, the two separators 132*a*, 132*b* separate the substrate material 130 into three longitudinal substrate segments 130*a*, 130*b*, 130*c*. As will be described in more detail below, the one or more separators 132 of the depicted implementation comprise one or more susceptors (e.g., a resonant receiver) configured to be heated by the resonant transmitter of the control body.

In various implementations, the substrate material may comprise a tobacco material, a non-tobacco material, or a combination thereof. In the depicted implementation, the substrate material 130 comprises an extruded tobacco structure. For example, in some implementations the extruded structure may include, or may essentially be comprised of one or more of a tobacco, a tobacco related material, glycerin, water, a binder material, and/or fillers and firming agents, such as, for example, calcium carbonate, rice flour, corn flour, etc. In various implementations, suitable binder materials may include alginates, such as ammonium alginate, propylene glycol alginate, potassium alginate, and sodium alginate. Alginates, and particularly high viscosity alginates, may be employed in conjunction with controlled levels of free calcium ions. Other suitable binder materials include hydroxypropylcellulose such as Klucel H from Aqualon Co.; hydroxypropylmethylcellulose such as Methocel K4MS from The Dow Chemical Co.; hydroxyethylcellulose such as Natrosol 250 MRCS from Aqualon Co.; microcrystalline cellulose such as Avicel from FMC; methylcellulose such as Methocel A4M from The Dow Chemical Co.; and sodium carboxymethyl cellulose such as CMC 7HF and CMC 7H4F from Hercules Inc. Still other possible binder materials include starches (e.g., corn starch), guar gum, carrageenan, locust bean gum, pectins and xanthan gum. In some implementations, combinations or blends of two or more binder materials may be employed. Other examples of binder materials are described, for example, in U.S. Pat. No. 5,101,839 to Jakob et al.; and U.S. Pat. No. 4,924,887 to Raker et al., each of which is incorporated herein by reference in its entirety. In some implementations, the aerosol forming material may be provided as a portion of the binder material (e.g., propylene glycol alginate). In addition, in some implementations, the binder material may comprise nanocellulose derived from a tobacco or other biomass.

In some implementations, the substrate material may include an extruded material, as described in U.S. Pat. App. Pub. No. 2012/0042885 to Stone et al., which is incorporated herein by reference in its entirety. In yet another implementation, the substrate material may include an extruded structure and/or substrate formed from marumarized and/or non-marumarized tobacco. Marumarized tobacco is known, for example, from U.S. Pat. No. 5,105,831 to Banerjee, et al., which is incorporated by reference herein in its entirety. Marumarized tobacco includes about 20 to about 50 percent (by weight) tobacco blend in powder form, with glycerol (at about 20 to about 30 percent weight), calcium carbonate (generally at about 10 to about 60 percent by weight, often at about 40 to about 60 percent by weight), along with binder agents, as described herein, and/or flavoring agents. In various implementations, the extruded material may have one or more longitudinal openings. In other implementations, the extruded material may have two or more sectors, such as, for example, an extrudate with a wagon wheel-like cross-section.

Additionally or alternatively, the substrate material may include an extruded structure and/or a substrate that includes or essentially is comprised of tobacco, glycerin, water, and/or binder material, and is further configured to substantially maintain its structure throughout the aerosol-generating process. That is, the substrate material may be configured to substantially maintain its shape (e.g., the substrate material does not continually deform under an applied shear stress) throughout the aerosol-generating process. Although such an example substrate material may include liquids and/or some moisture content, the substrate material may remain substantially solid throughout the aerosol-generating process and may substantially maintain structural integrity throughout the aerosol-generating process. Example tobacco and/or tobacco related materials that may be suitable for a substantially solid tobacco substrate materials are described in U.S. Pat. App. Pub. No. 2015/0157052 to Ademe et al.; U.S. Pat. App. Pub. No. 2015/0335070 to Sears et al.; U.S. Pat. No. 6,204,287 to White; and U.S. Pat. No. 5,060,676 to Hearn et al., which are incorporated herein by reference in their entirety.

In other implementations, the substrate material may comprise a blend of flavorful and aromatic tobaccos in cut filler form. In another implementation, the substrate material may comprise a reconstituted tobacco material, such as described in U.S. Pat. No. 4,807,809 to Pryor et al.; U.S. Pat. No. 4,889,143 to Pryor et al. and U.S. Pat. No. 5,025,814 to Raker, the disclosures of which are incorporated herein by reference in their entirety. Additionally, a reconstituted tobacco material may include a reconstituted tobacco paper for the type of cigarettes described in Chemical and Biological Studies on New Cigarette Prototypes that Heat Instead of Burn Tobacco, R. J. Reynolds Tobacco Company Monograph (1988), the contents of which are incorporated herein by reference in its entirety. For example, a reconstituted tobacco material may include a sheet-like material containing tobacco and/or tobacco-related materials. As such, in some implementations, the substrate material may be formed from a wound roll of a reconstituted tobacco material. In another implementation, the substrate material may be formed from shreds, strips, and/or the like of a reconstituted tobacco material. In another implementation, the tobacco sheet may comprise a crimped sheet of reconstituted tobacco material. In some implementations, the substrate material may comprise overlapping layers (e.g., a gathered web), which may, or may not, include heat conducting constituents. Examples of substrate materials that include a series of overlapping layers (e.g., gathered webs) of an initial substrate sheet formed by the fibrous filler material, aerosol forming material, and plurality of heat conducting constituents are described in U.S. Pat. App. Pub. No. 2019/0261685 to Sebastian, et al., which is incorporated herein by reference in its entirety.

In some implementations, the substrate material may include a plurality of microcapsules, beads, granules, and/or the like having a tobacco-related material. For example, a representative microcapsule may be generally spherical in shape, and may have an outer cover or shell that contains a liquid center region of a tobacco-derived extract and/or the like. In some implementations, the substrate material may include a plurality of microcapsules each formed into a hollow cylindrical shape. In some implementations, the substrate material may include a binder material configured to maintain the structural shape and/or integrity of the plurality of microcapsules formed into the hollow cylindrical shape.

Tobacco employed in one or more of the substrate materials may include, or may be derived from, tobaccos such as flue-cured tobacco, burley tobacco, Oriental tobacco, Maryland tobacco, dark tobacco, dark-fired tobacco and *rustica* tobacco, as well as other rare or specialty tobaccos, or blends thereof. Various representative tobacco types, processed types of tobaccos, and types of tobacco blends are set forth in U.S. Pat. No. 4,836,224 to Lawson et al.; U.S. Pat. No. 4,924,888 to Perfetti et al.; U.S. Pat. No. 5,056,537 to Brown et al.; U.S. Pat. No. 5,159,942 to Brinkley et al.; U.S. Pat. No. 5,220,930 to Gentry; U.S. Pat. No. 5,360,023 to Blakley et al.; U.S. Pat. No. 6,701,936 to Shafer et al.; U.S. Pat. No. 6,730,832 to Dominguez et al.; U.S. Pat. No. 7,011,096 to Li et al.; U.S. Pat. No. 7,017,585 to Li et al.; U.S. Pat. No. 7,025,066 to Lawson et al.; U.S. Pat. App. Pub. No. 2004/0255965 to Perfetti et al.; PCT Pub. No. WO 02/37990 to Bereman; and Bombick et al., *Fund. Appl. Toxicol.*, 39, p. 11-17 (1997); the disclosures of which are incorporated herein by reference in their entireties.

In various implementations, the substrate material may take on a variety of conformations based upon the various amounts of materials utilized therein. For example, a sample substrate material may comprise up to approximately 98% by weight, up to approximately 95% by weight, or up to approximately 90% by weight of a tobacco and/or tobacco related material. A sample substrate material may also comprise up to approximately 25% by weight, approximately 20% by weight, or approximately 15% by weight water—particularly approximately 2% to approximately 25%, approximately 5% to approximately 20%, or approximately 7% to approximately 15% by weight water. Flavors and the like (which include, for example, medicaments, such as nicotine) may comprise up to approximately 10%, up to about 8%, or up to about 5% by weight of the aerosol delivery component.

In some implementations, flame/burn retardant materials and other additives may be included within the substrate material and may include organo-phosophorus compounds, borax, hydrated alumina, graphite, potassium tripolyphosphate, dipentaerythritol, pentaerythritol, and polyols. Others such as nitrogenous phosphonic acid salts, mono-ammonium phosphate, ammonium polyphosphate, ammonium bromide, ammonium borate, ethanolammonium borate, ammonium sulphamate, halogenated organic compounds, thiourea, and antimony oxides are suitable but are not preferred agents. In each aspect of flame-retardant, burn-retardant, and/or scorch-retardant materials used in the substrate material and/or other components (whether alone or in combination with each other and/or other materials), the desirable properties most preferably are provided without undesirable off-gassing or melting-type behavior. Other examples include diammonium phosphate and/or another salt configured to help prevent ignition, pyrolysis, combustion, and/or scorching of the substrate material by the heat source. Various manners and methods for incorporating tobacco into smoking articles, and particularly smoking articles that are designed so as to not purposefully burn virtually all of the tobacco within those smoking articles are set forth in U.S. Pat. No. 4,947,874 to Brooks et al.; U.S. Pat. No. 7,647,932 to Cantrell et al.; U.S. Pat. No. 8,079,371 to Robinson et al.; U.S. Pat. No. 7,290,549 to Banerjee et al.; and U.S. Pat. App. Pub. No. 2007/0215167 to Crooks et al.; the disclosures of which are incorporated herein by reference in their entireties.

According to other implementations of the present disclosure, the substrate material may also incorporate tobacco additives of the type that are traditionally used for the manufacture of tobacco products. Those additives may include the types of materials used to enhance the flavor and aroma of tobaccos used for the production of cigars, cigarettes, pipes, and the like. For example, those additives may include various cigarette casing and/or top dressing components. See, for example, U.S. Pat. No. 3,419,015 to Wochnowski; U.S. Pat. No. 4,054,145 to Berndt et al.; U.S. Pat. No. 4,887,619 to Burcham, Jr. et al.; U.S. Pat. No. 5,022,416 to Watson; U.S. Pat. No. 5,103,842 to Strang et al.; and U.S. Pat. No. 5,711,320 to Martin; the disclosures of which are incorporated herein by reference in their entireties. Preferred casing materials may include water, sugars and syrups (e.g., sucrose, glucose and high fructose corn syrup), humectants (e.g. glycerin or propylene glycol), and flavoring agents (e.g., cocoa and licorice). Those added components may also include top dressing materials (e.g., flavoring materials, such as menthol). See, for example, U.S. Pat. No. 4,449,541 to Mays et al., the disclosure of which is incorporated herein by reference in its entirety. Further materials that may be added include those disclosed in U.S. Pat. No. 4,830,028 to Lawson et al. and U.S. Pat. No. 8,186,360 to Marshall et al., the disclosures of which are incorporated herein by reference in their entireties.

In various implementations, one or more of the substrate materials may have an aerosol precursor composition associated therewith. For example, in some implementations the aerosol precursor composition may comprise one or more different components, such as polyhydric alcohol (e.g., glycerin, propylene glycol, or a mixture thereof). Representative types of further aerosol precursor compositions are set forth in U.S. Pat. No. 4,793,365 to Sensabaugh, Jr. et al.; U.S. Pat. No. 5,101,839 to Jakob et al.; PCT WO 98/57556 to Biggs et al.; and Chemical and Biological Studies on New Cigarette Prototypes that Heat Instead of Burn Tobacco, R. J. Reynolds Tobacco Company Monograph (1988); the disclosures of which are incorporated herein by reference. In some aspects, a substrate material may produce a visible aerosol upon the application of sufficient heat thereto (and cooling with air, if necessary), and the substrate material may produce an aerosol that is "smoke-like." In other aspects, the substrate material may produce an aerosol that is substantially non-visible but is recognized as present by other characteristics, such as flavor or texture. Thus, the nature of the produced aerosol may be variable depending upon the specific components of the aerosol delivery component. The aerosol may be chemically simple relative to the chemical nature of the smoke produced by burning tobacco.

In some implementations, the aerosol precursor composition may comprise one or more humectants such as, for example, propylene glycol, glycerin, and/or the like. In various implementations, the amount of the aerosol precursor composition that is used within the aerosol delivery device may be such that the aerosol delivery device exhibits acceptable sensory and organoleptic properties, and desirable performance characteristics. For example, in some implementations the aerosol precursor composition (such as, for example, glycerin and/or propylene glycol), may be employed in order to provide for the generation of a visible mainstream aerosol that in many regards resembles the appearance of tobacco smoke. For example, the amount of aerosol precursor composition incorporated into the substrate material of the smoking article may be in the range of about 4.5 grams or less, 3.5 grams or less, about 3 grams or less, about 2.5 grams or less, about 2 grams or less, about 1.5 grams or less, about 1 gram or less, or about 0.5 gram or less. It should be noted, however, that in other implementations values outside of these ranges are possible.

Representative types of further aerosol precursor compositions are set forth in U.S. Pat. No. 4,793,365 to Sensabaugh, Jr. et al.; U.S. Pat. No. 5,101,839 to Jakob et al.; PCT WO 98/57556 to Biggs et al.; and Chemical and Biological Studies on New Cigarette Prototypes that Heat Instead of Burn Tobacco, R. J. Reynolds Tobacco Company Monograph (1988); the disclosures of which are incorporated herein by reference. In some aspects, an aerosol source member may produce a visible aerosol upon the application of sufficient heat thereto (and cooling with air, if necessary), and the aerosol source member may produce an aerosol that is "smoke-like." In other aspects, the aerosol source member may produce an aerosol that is substantially non-visible but is recognized as present by other characteristics, such as flavor or texture. Thus, the nature of the produced aerosol may be variable depending upon the specific components of the aerosol delivery component. In various implementations, the aerosol source member may be chemically simple relative to the chemical nature of the smoke produced by burning tobacco.

In some implementations, the aerosol precursor composition, also referred to as a vapor precursor composition or "e-liquid," may comprise a variety of components including, by way of example, a polyhydric alcohol (e.g., glycerin, propylene glycol, or a mixture thereof), nicotine, tobacco, tobacco extract, and/or flavorants. Some possible types of aerosol precursor components and formulations are set forth and characterized in U.S. Pat. No. 7,217,320 to Robinson et al. and U.S. Pat. App. Pub. Nos. 2013/0008457 to Zheng et al.; 2013/0213417 to Chong et al.; 2014/0060554 to Collett et al.; 2015/0020823 to Lipowicz et al.; and 2015/0020830 to Koller, as well as WO 2014/182736 to Bowen et al, the disclosures of which are incorporated herein by reference. Other aerosol precursors that may be employed include the aerosol precursors that have been incorporated in VUSE® products by R. J. Reynolds Vapor Company, the BLU™ products by Fontem Ventures B.V., the MISTIC MENTHOL product by Mistic Ecigs, MARK TEN products by Nu Mark LLC, the JUUL product by Juul Labs, Inc., and VYPE products by CN Creative Ltd. Also possible are the so-called "smoke juices" for electronic cigarettes that have been available from Johnson Creek Enterprises LLC. Still further examples of possible aerosol precursor compositions are sold under the brand names BLACK NOTE, COSMIC FOG, THE MILKMAN E-LIQUID, FIVE PAWNS, THE VAPOR CHEF, VAPE WILD, BOOSTED, THE STEAM FACTORY, MECH SAUCE, CASEY JONES MAINLINE RESERVE, MITTEN VAPORS, DR. CRIMMY'S V-LIQUID, SMILEY E LIQUID, BEANTOWN VAPOR, CUTTWOOD, CYCLOPS VAPOR, SICBOY, GOOD LIFE VAPOR, TELEOS, PINUP VAPORS, SPACE JAM, MT. BAKER VAPOR, and JIMMY THE JUICE MAN.

The amount of aerosol precursor that is incorporated within the aerosol source member is such that the aerosol generating piece provides acceptable sensory and desirable performance characteristics. For example, it is desired that sufficient amounts of aerosol forming material be employed in order to provide for the generation of a visible mainstream aerosol that in many regards resembles the appearance of tobacco smoke. The amount of aerosol precursor within the aerosol generating system may be dependent upon factors such as the number of puffs desired per aerosol generating piece. In one or more embodiments, about 0.5 ml or more, about 1 ml or more, about 2 ml or more, about 5 ml or more, or about 10 ml or more of the aerosol precursor composition may be included.

In some implementations, the aerosol precursor composition may incorporate nicotine, which may be present in various concentrations. The source of nicotine may vary, and the nicotine incorporated in the aerosol precursor composition may derive from a single source or a combination of two or more sources. For example, in some implementations the aerosol precursor composition may include nicotine derived from tobacco. In other implementations, the aerosol precursor composition may include nicotine derived from other organic plant sources, such as, for example, non-tobacco plant sources including plants in the Solanaceae family. In other implementations, the aerosol precursor composition may include synthetic nicotine. In some implementations, nicotine incorporated in the aerosol precursor composition may be derived from non-tobacco plant sources, such as other members of the Solanaceae family. The aerosol precursor composition may additionally or alternatively include other active ingredients including, but not limited to, botanical ingredients (e.g., lavender, peppermint, chamomile, basil, rosemary, thyme, eucalyptus, ginger, cannabis, ginseng, maca, and tisanes), melatonin, stimulants (e.g., caffeine, theine, and guarana), amino acids (e.g., taurine, theanine, phenylalanine, tyrosine, and tryptophan) and/or pharmaceutical, nutraceutical, nootropic, psychoactive, and medicinal ingredients (e.g., vitamins, such as B6, B12, and C and cannabinoids, such as tetrahydrocannabinol (THC) and cannabidiol (CBD)). It should be noted that the aerosol precursor composition may comprise any constituents, derivatives, or combinations of any of the above.

As noted herein, the aerosol precursor composition may comprise or be derived from one or more botanicals or constituents, derivatives, or extracts thereof. As used herein, the term "botanical" includes any material derived from plants including, but not limited to, extracts, leaves, bark, fibres, stems, roots, seeds, flowers, fruits, pollen, husk, shells or the like. Alternatively, the material may comprise an active compound naturally existing in a botanical, obtained synthetically. The material may be in the form of liquid, gas, solid, powder, dust, crushed particles, granules, pellets, shreds, strips, sheets, or the like. Example botanicals are tobacco, eucalyptus, star anise, hemp, cocoa, cannabis, fennel, lemongrass, peppermint, spearmint, rooibos, chamomile, flax, ginger, ginkgo biloba, hazel, hibiscus, laurel, licorice (liquorice), matcha, mate, orange skin, papaya, rose, sage, tea such as green tea or black tea, thyme, clove, cinnamon, coffee, aniseed (anise), basil, bay leaves, cardamom, coriander, cumin, nutmeg, oregano, paprika, rosemary, saffron, lavender, lemon peel, mint, juniper, elderflower, vanilla, wintergreen, beefsteak plant, curcuma, turmeric, sandalwood, cilantro, bergamot, orange blossom, myrtle, cassis, valerian, pimento, mace, damien, marjoram, olive, lemon balm, lemon basil, chive, carvi, verbena, tarragon, geranium, mulberry, ginseng, theanine, theacrine, maca, ashwagandha, damiana, guarana, chlorophyll, baobab or any combination thereof. The mint may be chosen from the following mint varieties: *Mentha arventis, Mentha* c.v., *Mentha niliaca, Mentha piperita, Mentha piperita citrata* c.v., *Mentha piperita* c.v, *Mentha spicata crispa, Mentha cardifolia, Memtha longifolia, Mentha suaveolens variegata, Mentha pulegium, Mentha spicata* c.v. and *Mentha suaveolens.*

A wide variety of types of flavoring agents, or materials that alter the sensory or organoleptic character or nature of the mainstream aerosol of the smoking article may be suitable to be employed. In some implementations, such flavoring agents may be provided from sources other than tobacco and may be natural or artificial in nature. For example, some flavoring agents may be applied to, or incorporated within, the substrate material and/or those regions of the smoking article where an aerosol is generated. In some implementations, such agents may be supplied directly to a heating cavity or region proximate to the heat source or are provided with the substrate material. Example flavoring agents may include, for example, vanillin, ethyl vanillin, cream, tea, coffee, fruit (e.g., apple, cherry, strawberry, peach and citrus flavors, including lime and lemon), maple, menthol, mint, peppermint, spearmint, wintergreen, nutmeg, clove, lavender, cardamom, ginger, honey, anise, sage, cinnamon, sandalwood, jasmine, cascarilla, cocoa, licorice, and flavorings and flavor packages of the type and character traditionally used for the flavoring of cigarette, cigar, and pipe tobaccos. Syrups, such as high fructose corn syrup, may also be suitable to be employed.

As used herein, the terms "flavor," "flavorant," "flavoring agents," etc. refer to materials which, where local regulations permit, may be used to create a desired taste, aroma, or other somatosensorial sensation in a product for adult consumers. They may include naturally occurring flavor materials, botanicals, extracts of botanicals, synthetically obtained materials, or combinations thereof (e.g., tobacco, cannabis, licorice (liquorice), hydrangea, eugenol, Japanese white bark magnolia leaf, chamomile, fenugreek, clove, maple, matcha, menthol, Japanese mint, aniseed (anise), cinnamon, turmeric, Indian spices, Asian spices, herb, wintergreen, cherry, berry, red berry, cranberry, peach, apple, orange, mango, clementine, lemon, lime, tropical fruit, papaya, rhubarb, grape, durian, dragon fruit, cucumber, blueberry, mulberry, citrus fruits, Drambuie, bourbon, scotch, whiskey, gin, tequila, rum, spearmint, peppermint, lavender, aloe vera, cardamom, celery, cascarilla, nutmeg, sandalwood, bergamot, geranium, khat, naswar, betel, shisha, pine, honey essence, rose oil, vanilla, lemon oil, orange oil, orange blossom, cherry blossom, cassia, caraway, cognac, jasmine, ylang-ylang, sage, fennel, wasabi, piment, ginger, coriander, coffee, hemp, a mint oil from any species of the genus Mentha, eucalyptus, star anise, cocoa, lemongrass, rooibos, flax, ginkgo biloba, hazel, hibiscus, laurel, mate, orange skin, rose, tea such as green tea or black tea, thyme, juniper, elderflower, basil, bay leaves, cumin, oregano, paprika, rosemary, saffron, lemon peel, mint, beefsteak plant, curcuma, cilantro, myrtle, cassis, valerian, pimento, mace, damien, marjoram, olive, lemon balm, lemon basil, chive, carvi, verbena, tarragon, limonene, thymol, camphene), flavor enhancers, bitterness receptor site blockers, sensorial receptor site activators or stimulators, sugars and/or sugar substitutes (e.g., sucralose, acesulfame potassium, aspartame, saccharine, cyclamates, lactose, sucrose, glucose, fructose, sorbitol, or mannitol), and other additives such as charcoal, chlorophyll, minerals, botanicals, or breath freshening agents. They may be imitation, synthetic or natural ingredients or blends thereof. They may be in any suitable form, for example, liquid such as an oil, solid such as a powder, or gas.

In some implementations, the flavor comprises menthol, spearmint and/or peppermint. In some embodiments, the flavor comprises flavor components of cucumber, blueberry, citrus fruits and/or redberry. In some embodiments, the flavor comprises eugenol. In some embodiments, the flavor comprises flavor components extracted from tobacco. In some embodiments, the flavor comprises flavor components extracted from cannabis.

In some implementations, the flavor may comprise a sensate, which is intended to achieve a somatosensorial sensation which are usually chemically induced and perceived by the stimulation of the fifth cranial nerve (trigeminal nerve), in addition to or in place of aroma or taste nerves, and these may include agents providing heating, cooling, tingling, numbing effect. A suitable heat effect agent may be, but is not limited to, vanillyl ethyl ether and a suitable cooling agent may be, but not limited to eucolyptol, WS-3.

Flavoring agents may also include acidic or basic characteristics (e.g., organic acids, such as levulinic acid, succinic acid, pyruvic acid, and benzoic acid). In some implementations, flavoring agents may be combinable with the elements of the substrate material if desired. Example plant-derived compositions that may be suitable are disclosed in U.S. Pat. No. 9,107,453 and U.S. Pat. App. Pub. No. 2012/0152265 both to Dube et al., the disclosures of which are incorporated herein by reference in their entireties. Any of the materials, such as flavorings, casings, and the like that may be useful in combination with a tobacco material to affect sensory properties thereof, including organoleptic properties, such as described herein, may be combined with the substrate material. Organic acids particularly may be able to be incorporated into the substrate material to affect the flavor, sensation, or organoleptic properties of medicaments, such as nicotine, that may be able to be combined with the substrate material. For example, organic acids, such as levulinic acid, lactic acid, and pyruvic acid, may be included in the substrate material with nicotine in amounts up to being equimolar (based on total organic acid content) with the nicotine. Any combination of organic acids may be suitable. For example, in some implementations, the substrate material may include approximately 0.1 to about 0.5 moles of levulinic acid per one mole of nicotine, approximately 0.1 to about 0.5 moles of pyruvic acid per one mole of nicotine, approximately 0.1 to about 0.5 moles of lactic acid per one mole of nicotine, or combinations thereof, up to a concentration wherein the total amount of organic acid present is equimolar to the total amount of nicotine present in the substrate material. Various additional examples of organic acids that may be employed to produce a substrate material are described in U.S. Pat. App. Pub. No. 2015/0344456 to Dull et al., which is incorporated herein by reference in its entirety.

The selection of such further components may be variable based upon factors such as the sensory characteristics that are desired for the smoking article, and the present disclosure is intended to encompass any such further components that are readily apparent to those skilled in the art of tobacco and tobacco-related or tobacco-derived products. See, Gutcho, Tobacco Flavoring Substances and Methods, Noyes Data Corp. (1972) and Leffingwell et al., Tobacco Flavoring for Smoking Products (1972), the disclosures of which are incorporated herein by reference in their entireties.

In some implementations, the substrate material may include other materials having a variety of inherent characteristics or properties. For example, the substrate material may include a plasticized material or regenerated cellulose in the form of rayon. As another example, viscose (commercially available as VISIL®), which is a regenerated cellulose product incorporating silica, may be suitable. Some carbon fibers may include at least 95 percent carbon or more. Similarly, natural cellulose fibers such as cotton may be suitable, and may be infused or otherwise treated with silica, carbon, or metallic particles to enhance flame-retardant properties and minimize off-gassing, particularly of any undesirable off-gassing components that would have a negative impact on flavor (and especially minimizing the likelihood of any toxic off-gassing products). Cotton may be treatable with, for example, boric acid or various organophosphate compounds to provide desirable flame-retardant properties by dipping, spraying or other techniques known in the art. These fibers may also be treatable (coated, infused, or both by, e.g., dipping, spraying, or vapor-deposition) with organic or metallic nanoparticles to confer the desired property of flame-retardancy without undesirable off-gassing or melting-type behavior.

As noted above, one or more separators of the present invention comprise one or more susceptors configured to be heated by the resonant transmitter. In various implementations, one or more of the separators may be made of a ferromagnetic material including, but not limited to, cobalt, iron, nickel, zinc, manganese, and any combinations thereof. In other implementations, one or more of the separators may be made of other materials, including, for example, other metal materials such as aluminum or stainless steel, as well as ceramic materials such as silicon carbide, carbon materials, and any combinations of any of the materials described above. In still other implementations, one or more of the separators may be made of other conductive materials including metals such as copper, alloys of conductive materials, or other materials with one or more conductive materials imbedded therein. For example, in some implementations one or more of the separators may be made of graphite. As will be discussed below, in some implementations one or more of the separators may be heated separately. In such a manner, individual substrate material segments may be heated, such as, for example, sequentially or in any other order. In the depicted implementation, the separators 132 have a disk shape having an overall circular cross-section with a thickness that is smaller than the diameter of the disk; however, in other implementations the separators may have other shapes and may have any thickness.

Referring back to FIG. 4, the separators 132 of the depicted implementation comprise porous conductive disks. It should be noted that in various implementations, the number and location of the disks may vary. In the depicted implementation, each of the separators 132 comprises a conductive disk having a plurality of discrete openings including a central opening 134 and a plurality of radial openings 136 extending therefrom. In particular, the porous conductive disks of the depicted implementation include a single central opening 134 and forty radial openings 136 comprising ten sets of four openings each, which extend outward from the central opening 134. It should be noted, however, that in other implementations the amount and location of the openings may differ. For example, in some implementations there may be more or less openings, and the openings may form a variety of different patterns through the disk, including one or more random patterns. Although in the depicted implementation the central opening 134 and the plurality of radial openings 136 are substantially the same size. In other implementations, however, the openings may have different sizes. In still other openings, the material used for the disk may be a porous material that does not have discrete openings. In the depicted implementation, the openings may provide airflow between the substrate segments.

In the depicted implementation, a change in current in the helical coil 128 (i.e., the resonant transmitter), as directed thereto from the power source and/or by the control component (e.g., via a driver circuit) may produce an alternating electromagnetic field that penetrates the separators 132 (i.e., the resonant receiver), thereby generating electrical eddy currents within the plurality of separators 132. In some implementations, the alternating electromagnetic field may be produced by directing alternating current to the helical coil. As noted above, in some implementations, the control component 122 may include an inverter or inverter circuit configured to transform direct current provided by the power source to alternating current that is provided to the resonant transmitter.

The eddy currents flowing in the separators 132 may generate heat through the Joule effect, wherein the amount of heat produced is proportional to the square of the electrical current times the electrical resistance of the material of the separators 132. For implementations wherein the separators 132 comprise ferromagnetic materials, heat may also be generated by magnetic hysteresis losses. Several factors contribute to the temperature rise of the separators 132 including, but not limited to, proximity to the helical coil 128, distribution of the magnetic field, electrical resistivity of the material of the separators 132, saturation flux density, skin effects or depth, hysteresis losses, magnetic susceptibility, magnetic permeability, and dipole moment of the material.

In this regard and as noted above, both the separators 132 and the helical coil 128 may comprise an electrically conductive material. By way of example, the helical coil 128 and/or the separators 132 may comprise various conductive materials including metals such as copper or aluminum, alloys of conductive materials (e.g., diamagnetic, paramagnetic, or ferromagnetic materials) or other materials such as a ceramic or glass with one or more conductive materials imbedded therein. In another implementation, a resonant receiver may comprise conductive particles. In some implementations, a resonant receiver may be coated with or otherwise include a thermally conductive passivation layer (e.g., a thin layer of glass).

FIG. 5 illustrates a schematic view of a substrate portion 210 of an aerosol source member according to another example implementation of the present disclosure. In the depicted implementation, the substrate portion 210 includes a substrate material and one or more separators 232. Although other implementations may differ, the depicted implementation includes two separators 232*a*, 232*b*. In the depicted implementation, the separators 232 are configured to separate the substrate material 230 into a plurality of separate longitudinal substrate segments. In particular, the two separators 232*a*, 232*b* separate the substrate material 230 into three longitudinal substrate segments 230*a*, 230*b*, 230*c*.

In various implementations, the substrate material may comprise a tobacco material, a non-tobacco material, or a combination thereof. Reference is made to the discussion above relating to substrate materials, and various features, additives, and variations thereof. In the depicted implementation, the separators 232 comprise susceptors (e.g., a resonant receiver) configured to be heated by the resonant transmitter of the control body. Reference is made to the discussion above of possible susceptor shapes, materials, and variations thereof.

In the depicted implementation, each of the separators 232 comprises a substantially planar conductive spiral coil 238 comprising a single wire or ribbon that includes an inner end, a number of substantially circular turns with spaces between the turns, and an outer end. As such, in various implementations the spiral coil may define an inner diameter, an outer diameter, and turn spacing (e.g., a distance between adjacent turns). In the depicted implementation, the spaces between the turns may provide airflow between the substrate segments. While in the depicted implementation, the inner end of the spiral coil 238 is located some distance from the center of the substrate portion 210, in other implementations, the inner end of the spiral coil may be proximate the center of the substrate material 210. In addition, while in the depicted implementation the spiral coil comprises a single wire or ribbon having approximately three turns, with the outer end located proximate an outer perimeter of the substrate material 210, in other implementations, any number of wires and any number of turns are possible. In addition, in some implementations the end of the spiral coil may be located some distance from the outer perimeter of the substrate material.

FIG. 6 illustrates a schematic view of a substrate portion 310 of an aerosol source member according to another example implementation of the present disclosure. In the depicted implementation, the substrate portion 310 includes a substrate material and one or more separators 332. Although other implementations may differ, the depicted implementation includes two separators 332*a*, 332*b*. In the depicted implementation, the separators 332 are configured to separate the substrate material 330 into a plurality of separate longitudinal substrate segments. In particular, the two separators 332*a*, 332*b* separate the substrate material 330 into three longitudinal substrate segments 330*a*, 330*b*, 330*c*.

In various implementations, the substrate material may comprise a tobacco material, a non-tobacco material, or a combination thereof. Reference is made to the discussion above relating to substrate materials, and various features, additives, and variations thereof. In the depicted implementation, the separators 332 comprise susceptors (e.g., a resonant receiver) configured to be heated by the resonant transmitter of the control body. Reference is made to the discussion above of possible susceptor shapes, materials, and variations thereof.

In the depicted implementation, each of the separators 332 comprises a gathered web (e.g., a series of substantially planar layers folded on top of each other with spaces located between the layers). In the depicted implementation, the gathered web is oriented such that the spaces between the layers provides airflow between the substrate segments. While in the depicted implementation, the gathered web comprises a single web with nine layers, in other implementations the gathered web may have more or less layers, which may comprise a single web or multiple webs. In some implementations, the gathered web may itself comprise a multilayer sheet, such as for example, a multilayer laminate. For example, in some implementations one or more of the layers of the gathered web may include a susceptor layer and one or more additional layers, which may include, but need not be limited to, a tobacco or non-tobacco sheet with a flavorant, an aerosol former (such as, for example, an aerosol precursor composition), a fragrance material, nicotine, or any combinations thereof.

In some implementations, the one or more separators comprising one or more susceptors of the inductive heating arrangement may be supplemented with additional susceptors. For example, in some implementations the substrate portion may include a plurality of conductive particles, which may serve as supplemental susceptors. In some implementations, for example, a plurality of conductive particles may be substantially uniformly distributed through the substrate portion (e.g., substantially uniformly distributed through one or more substrate segments). In other implementations, however, a plurality of conductive particles may be concentrated in one or more of the substrate segments. In other implementations, a plurality of conductive particles may be concentrated in one or more areas of the substrate portion. In various implementations, the conductive particles may be made of any of the susceptor materials described above.

In various implementations, the plurality of conductive particles may have a variety of shapes, sizes, and materials, which, in some implementations, may be combined within the same substrate portion. For example, in some implementations one or more of the plurality of conductive particles may have a flake-like shape, a substantially spherical shape, a substantially hexagonal shape, a substantially cubic shape, an irregular shape (such as, for example, a shape having one or more (e.g., multiple) sides with differing dimensions), or any combinations thereof. Although in various implementations, the size of a conductive particle may vary, in some implementations one or more of the plurality of conductive particles may have a diameter in the inclusive range of approximately 100 microns (0.1 mm) to approximately 2 mm. It should be noted that in some implementations, the conductive particles may take the form of a sintered monolith, which may not have a delimited diameter range.

In some implementations that include conductive particles, a change in current in the resonant transmitter (e.g., the helical coil of FIG. 3), as directed thereto from the power source by the control component (e.g., via a driver circuit) may produce an alternating electromagnetic field that penetrates the plurality of conductive particles (e.g., the supplemental susceptors), thereby generating electrical eddy currents within the plurality of conductive particles. In some implementations, the alternating electromagnetic field may be produced by directing alternating current to the resonant transmitter. As noted above, in some implementations, the control component may include an inverter or inverter circuit configured to transform direct current provided by the power source to alternating current that is provided to the resonant transmitter.

As with the separators, the eddy currents flowing in the plurality of conductive particles may generate heat through the Joule effect, wherein the amount of heat produced is proportional to the square of the electrical current times the electrical resistance of the material of the plurality of conductive particles. For implementations wherein the plurality of conductive particles comprises ferromagnetic materials, heat may also be generated by magnetic hysteresis losses. Several factors contribute to the temperature rise of the plurality of conductive particles including, but not limited to, proximity to the resonant transmitter, distribution of the magnetic field, electrical resistivity of the material of the plurality of conductive particles, saturation flux density, skin effects or depth, hysteresis losses, magnetic susceptibility, magnetic permeability, and dipole moment of the material.

Accordingly, the plurality of conductive particles may be heated by the resonant transmitter. In addition to the heat produced by the separators, the heat produced by the plurality of conductive particles may also heat the substrate portion, which may release an aerosol (e.g., in addition to the aerosol released by heating of the one or more separators).

In some implementations, the inductive heating arrangement of the present disclosure may be configured to heat different segments of the substrate portion at different times. In such a manner, the inductive heating arrangement may provide segmented heating of the substrate segments. For example, in some implementations the inductive heating arrangement of the present invention may be configured to heat a first substrate segment and then, subsequently, heat a second or further substrate segment. In such a manner, the inductive heating arrangement may be configured to progressively heat the substrate portion. In some implementations, the inductive heating arrangement of the present invention may be configured to heat individual or multiple substrate segments at the same time. Some examples of segmented heating are described in U.S. patent application Ser. No. 15/976,526, filed on May 10, 2018, and titled Control Component for Segmented Heating in an Aerosol Delivery Device, which is incorporated herein by reference in its entirety.

In some implementations, the separator(s) may extend longitudinally along at least a portion of the substrate portion. In such a manner, the separator(s) may separate the substrate material into a plurality of (e.g. two or more) separate radial substrate segments. One example of such an implementation is shown in FIGS. 7A and 7B. In particular, FIG. 7A illustrates a schematic view of a substrate portion 410 of an aerosol source member, and FIG. 7B illustrates a schematic transverse cross-section of the substrate portion 410 of FIG. 7A. In the depicted implementation, the substrate portion 410 includes a substrate material 430 and a longitudinal separator 432. Although other implementations may differ, the depicted implementation includes a single separator. In the depicted implementation, the separator 432 is configured to separate the substrate material 430 into two radial substrate segments 430*a* and 430*b*.

In various implementations, the substrate material may comprise a tobacco material, a non-tobacco material, or a combination thereof. Although other processes are possible, in the depicted implementation the substrate material 430 and the separator 432 are the result of a co-extrusion process. Reference is made to the discussion above relating to substrate materials, and various features, additives, and variations thereof. In the depicted implementation, the separator 432 comprises a susceptor (e.g., a resonant receiver) configured to be heated by the resonant transmitter of the control body. Although other shapes and configurations are possible, in the depicted implementation the substrate material 430 is substantially cylindrical and the separator 432 comprises a central rounded portion 440 and a pair of substantially flat connected flanges 442*a*, 442*b* extending outwardly therefrom. Still other implementations may have other shapes and configurations. Reference is made to the discussion above of possible susceptor shapes, materials, and variations thereof.

In some implementations, the one or more separators comprising one or more susceptors of the inductive heating arrangement may be supplemented with additional susceptors. Reference is made to the discussion above regarding implementations that include additional susceptors. In some implementations, the inductive heating arrangement of the present disclosure may be configured to heat different segments of the substrate portion at different times. In such a manner, the inductive heating arrangement may provide segmented heating of the substrate segments. Reference is made to the discussion above regarding segmented heating.

Another example of a separator that extends longitudinally along at least a portion of a substrate portion is shown in FIG. 8A. In particular, FIG. 8A illustrates a schematic transverse cross-section of a substrate portion 510 of an aerosol source member. In the depicted implementation, the substrate portion 510 includes a substrate material 530 and a separator 532. Although other implementations may differ, the depicted implementation includes a single separator. In the depicted implementation, the separator 532 is configured to separate the substrate material 530 into three radial substrate segments 530*a*, 530*b*, and 530*b*.

In various implementations, the substrate material may comprise a tobacco material, a non-tobacco material, or a combination thereof. Although other processes are possible, in the depicted implementation the substrate material 530 and the separator 532 are the result of a co-extrusion process. Reference is made to the discussion above relating to substrate materials, and various features, additives, and variations thereof. In the depicted implementation, the separator 532 comprises a susceptor (e.g., a resonant receiver) configured to be heated by the resonant transmitter of the control body. Although other shapes and configurations are possible, in the depicted implementation the substrate material 530 is substantially cylindrical and the separator 532 comprises a triangular cross-section shape defining three points 542*a*, 542*b*, and 542*c*. Still other implementations may have other shapes and configurations. Reference is made to the discussion above of possible susceptor shapes, materials, and variations thereof.

In some implementations, the one or more separators comprising one or more susceptors of the inductive heating arrangement may be supplemented with additional susceptors. Reference is made to the discussion above regarding implementations that include additional susceptors. In some implementations, the inductive heating arrangement of the present disclosure may be configured to heat different segments of the substrate portion at different times. In such a manner, the inductive heating arrangement may provide segmented heating of the substrate segments. Reference is made to the discussion above regarding segmented heating.

Another example of a separator that extends longitudinally along at least a portion of a substrate portion is shown in FIG. 8B. In particular, FIG. 8B illustrates a schematic transverse cross-section of a substrate portion 610 of an aerosol source member. In the depicted implementation, the substrate portion 610 includes a substrate material 630 and a separator 632. Although other implementations may differ, the depicted implementation includes a single separator. In the depicted implementation, the separator 632 is configured to separate the substrate material 630 into a plurality of separate radial substrate segments. In particular, the separator 632 separates the substrate material 630 into four radial substrate segments 630*a*, 630*b*, 630*c*, and 630*d*.

In various implementations, the substrate material may comprise a tobacco material, a non-tobacco material, or a combination thereof. In the depicted implementation, the substrate material 630 and the separator 632 are the result of a co-extrusion process, although other processes are possible. Reference is made to the discussion above relating to substrate materials, and various features, additives, and variations thereof. In the depicted implementation, the separator 632 comprises a susceptor (e.g., a resonant receiver) configured to be heated by the resonant transmitter of the control body. Although other shapes and configurations are possible, in the depicted implementation the substrate material 630 is substantially cylindrical and the separator 632 comprises a star cross-section shape defining four points 642*a*, 642*b*, 642*c*, and 642*d*. Still other implementations may have other shapes and configurations. Reference is made to the discussion above of possible susceptor shapes, materials, and variations thereof.

In some implementations, the one or more separators comprising one or more susceptors of the inductive heating arrangement may be supplemented with additional susceptors. Reference is made to the discussion above regarding implementations that include additional susceptors. In some implementations, the inductive heating arrangement of the present disclosure may be configured to heat different segments of the substrate portion at different times. In such a manner, the inductive heating arrangement may provide segmented heating of the substrate segments. Reference is made to the discussion above regarding segmented heating.

Another example of a separator that extends longitudinally along at least a portion of a substrate portion is shown in FIG. 8C. In particular, FIG. 8C illustrates a schematic transverse cross-section of a substrate portion 710 of an aerosol source member. In the depicted implementation, the substrate portion 710 includes a substrate material 730 and a separator 732. Although other implementations may differ, the depicted implementation includes a single separator. In the depicted implementation, the separator 732 is configured to separate the substrate material 730 into a plurality of separate radial substrate segments. In particular, the separator 732 separates the substrate material 730 into six radial substrate segments 730*a*, 730*b*, 730*c*, 730*d*, 730*e*, and 730*f*.

In various implementations, the substrate material may comprise a tobacco material, a non-tobacco material, or a combination thereof. In the depicted implementation, the substrate material 730 and the separator 732 are the result of a co-extrusion process, although other processes are possible. Reference is made to the discussion above relating to substrate materials, and various features, additives, and variations thereof. In the depicted implementation, the separator 732 comprises a susceptor (e.g., a resonant receiver) configured to be heated by the resonant transmitter of the control body. Although other shapes and configurations are possible, in the depicted implementation the substrate material 730 is substantially cylindrical and the separator 732 comprises a star cross-section shape defining six points 742*a*, 742*b*, 742*c*, 742*d*, 742*e*, and 742*f*. Still other implementations may have other shapes and configurations. Reference is made to the discussion above of possible susceptor shapes, materials, and variations thereof.

It should be noted that although the depicted implementations illustrate one or more separators that separate a substrate material into a plurality of separate longitudinal substrate segments, or one or more separators that separate a substrate material into a plurality of separate radial longitudinal substrate segments, in other implementations one or more separators may separate a substrate material into a plurality of separate substrate segments comprising both a plurality of longitudinal substrate segments and a plurality of radial substrate segments (e.g., a plurality of substrate segments some of which are separate longitudinal substrate segments and others of which are separate radial substrate segments, and/or a plurality of substrate segments that are separate in both a longitudinal sense and a radial sense). For example, in one implementation a separator may extend along a longitudinal length of a substrate material having a transverse cross-section that separates the substrate material into a plurality of radial substrate segments (such as, for example, one or more of the transverse cross-sections described above), and in addition, the separator may include one or more features positioned along the longitudinal length of the separator (such as, for example, one or more the features described above, such as one or more disks) that additionally separate the radial substrate segments into separate longitudinal and radial substrate segments.

In some implementations, the one or more separators comprising one or more susceptors of the inductive heating arrangement may be supplemented with additional susceptors. Reference is made to the discussion above regarding implementations that include additional susceptors. In some implementations, the inductive heating arrangement of the present disclosure may be configured to heat different segments of the substrate portion at different times. In such a manner, the inductive heating arrangement may provide segmented heating of the substrate segments. Reference is made to the discussion above regarding segmented heating.

It should be noted that although the aerosol source member and control body of the present disclosure may be provided together as a complete smoking article or pharmaceutical delivery article generally, the components also may be provided separately. For example, the present disclosure also encompasses a disposable unit for use with a reusable smoking article or a reusable pharmaceutical delivery article. In specific implementations, such a disposable unit (which may be an aerosol source member as illustrated in the appended figures) can comprise a substantially tubular shaped body having a heated end configured to engage the reusable smoking article or pharmaceutical delivery article, an opposing mouth end configured to allow passage of an inhalable substance to a consumer, and a wall with an outer surface and an inner surface that defines an interior space. Various implementations of an aerosol source member (or cartridge) are described in U.S. Pat. No. 9,078,473 to Worm et al., which is incorporated herein by reference.

In addition to the disposable unit, the present disclosure may further be characterized as providing a separate control body for use in a reusable smoking article or a reusable pharmaceutical delivery article. In specific implementations, the control body may generally be a housing having a receiving end (which may include a receiving chamber with an open end) for receiving a heated end of a separately provided aerosol source member. The control body may further include an electrical energy source that provides power to an electrical heating member, which may be a component of the control body or may be included in aerosol source member to be used with the control unit. In various implementations, the control body may also include further components, including an electrical power source (such as a battery), components for actuating current flow into the heating member, and components for regulating such current flow to maintain a desired temperature for a desired time and/or to cycle current flow or stop current flow when a desired temperature has been reached or the heating member has been heating for a desired length of time. In some implementations, the control unit further may comprise one or more pushbuttons associated with one or both of the components for actuating current flow into the heating member, and the components for regulating such current flow. The control body may also include one or more indicators, such as lights indicating the heater is heating and/or indicating the number of puffs remaining for an aerosol source member that is used with the control body.

Although the various figures described herein illustrate the control body and aerosol source member in a working relationship, it is understood that the control body and the aerosol source member may exist as individual devices. Accordingly, any discussion otherwise provided herein in relation to the components in combination also should be understood as applying to the control body and the aerosol source member as individual and separate components.

In another aspect, the present disclosure may be directed to kits that provide a variety of components as described herein. For example, a kit may comprise a control body with one or more aerosol source members. A kit may further comprise a control body with one or more charging components. A kit may further comprise a control body with one or more power sources. A kit may further comprise a control body with one or more aerosol source members and one or more charging components and/or one or more power sources. In further implementations, a kit may comprise a plurality of aerosol source members. A kit may further comprise a plurality of aerosol source members and one or more power sources and/or one or more charging components. In the above implementations, the aerosol source members or the control bodies may be provided with a heating member inclusive thereto. The inventive kits may further include a case (or other packaging, carrying, or storage component) that accommodates one or more of the further kit components. The case could be a reusable hard or soft container. Further, the case could be simply a box or other packaging structure.

Many modifications and other implementations of the disclosure will come to mind to one skilled in the art to which this disclosure pertains having the benefit of the teachings presented in the foregoing descriptions and the associated drawings. Therefore, it is to be understood that the disclosure is not to be limited to the specific implementations disclosed herein and that modifications and other implementations are intended to be included within the scope of the appended claims. Although specific terms are employed herein, they are used in a generic and descriptive sense only and not for purposes of limitation.

What is claimed is:

1. An aerosol delivery device comprising:
- a control body having a housing;
- a resonant transmitter located in the control body;
- a control component configured to drive the resonant transmitter; and
- an aerosol source member that includes a substrate portion at least a portion of which is configured to be positioned within range of a field emitted by the resonant transmitter,
- wherein the substrate portion includes a substrate material and a separator, wherein the separator comprises a longitudinal separator configured to separate the substrate material into two or more radial substrate segments, wherein the longitudinal separator includes at least one radial feature that extends to a radial periphery of the substrate portion, and wherein the separator comprises a susceptor configured to be heated by the resonant transmitter.

2. The aerosol delivery device of claim 1, wherein the at least one radial feature comprises at least one flange.

3. The aerosol delivery device of claim 1, wherein the at least one radial feature comprises a pair of substantially flat flanges.

4. The aerosol delivery device of claim 1, wherein the longitudinal separator comprises a triangular cross-section, and wherein the least one radial feature comprises at least three points.

5. The aerosol delivery device of claim 1, wherein the longitudinal separator comprises a star cross-section, and wherein the least one radial feature comprises at least four points.

6. The aerosol delivery device of claim 1, wherein the longitudinal separator comprises a star cross-section, and wherein the least one radial feature comprises at least six points.

7. The aerosol delivery device of claim 1, wherein the longitudinal separator includes a central rounded portion.

8. The aerosol delivery device of claim 1, wherein the substrate material includes a plurality of conductive particles mixed therein, and wherein the plurality of conductive particles comprise supplemental susceptors configured to be heated by the resonant transmitter.

9. The aerosol delivery device of claim 1, wherein the resonant transmitter and the longitudinal separator are configured for separate heating of the segmented substrate material.

10. An aerosol source member for use with an inductive heating aerosol delivery device that includes a resonant transmitter, the aerosol source member comprising:
- a substrate portion comprising a substrate material and a separator,
- wherein the separator comprises a longitudinal separator configured to separate the substrate material into two or more radial substrate segments, wherein the longitudinal separator includes at least one radial feature that extends to a radial periphery of the substrate portion, and wherein the longitudinal separator is configured to be heated by the resonant transmitter.

11. The aerosol source member of claim 10, wherein the at least one radial feature comprises at least one flange.

12. The aerosol source member of claim 11, wherein the at least one radial feature comprises a pair of substantially flat flanges.

13. The aerosol source member of claim 11, wherein the longitudinal separator comprises a triangular cross-section, and wherein the least one radial feature comprises at least three points.

14. The aerosol source member of claim 11, wherein the longitudinal separator comprises a star cross-section, and wherein the least one radial feature comprises at least four points.

15. The aerosol source member of claim 11, wherein the longitudinal separator comprises a star cross-section, and wherein the least one radial feature comprises at least six points.

16. The aerosol source member of claim 11, wherein the longitudinal separator includes a central rounded portion.

17. The aerosol source member of claim 11, wherein the substrate material includes a plurality of conductive particles mixed therein, and wherein the plurality of conductive particles comprise supplemental susceptors configured to be heated by the resonant transmitter.

18. The aerosol source member of claim 11, wherein the substrate material comprises one or more of cut filler tobacco material, an extruded tobacco material, a reconstituted tobacco sheet material, tobacco beads, tobacco powder, or any combinations thereof.

* * * * *